United States Patent
Ma et al.

(10) Patent No.: US 10,692,106 B2
(45) Date of Patent: Jun. 23, 2020

(54) DYNAMICALLY MODIFYING DIGITAL CONTENT DISTRIBUTION CAMPAIGNS BASED ON TRIGGERING CONDITIONS AND ACTIONS

(71) Applicant: Facebook, Inc., Menlo Park, CA (US)

(72) Inventors: Xiaoxiao Ma, Seattle, WA (US); Ko Ching Chang, Bellevue, WA (US); Mohamed Yasser Ahmed Hammad Nour, Sammamish, WA (US)

(73) Assignee: FACEBOOK, INC., Menlo Park, CA (US)

( * ) Notice: Subject to any disclaimer, the term of this patent is extended or adjusted under 35 U.S.C. 154(b) by 270 days.

(21) Appl. No.: 15/798,170

(22) Filed: Oct. 30, 2017

(65) Prior Publication Data

US 2019/0130436 A1 May 2, 2019

(51) Int. Cl.
*G06Q 30/00* (2012.01)
*G06Q 30/02* (2012.01)
*G06N 20/00* (2019.01)
*G06F 3/0481* (2013.01)
*G06F 3/0482* (2013.01)

(52) U.S. Cl.
CPC ......... *G06Q 30/0244* (2013.01); *G06N 20/00* (2019.01); *G06F 3/0482* (2013.01); *G06F 3/04817* (2013.01)

(58) Field of Classification Search
CPC .................................................. G06Q 30/0244
See application file for complete search history.

(56) References Cited

U.S. PATENT DOCUMENTS

2011/0112900 A1* 5/2011 Sanghavi ............... G06Q 30/02
705/14.43
2016/0307229 A1* 10/2016 Balasubrannanian .. G06F 9/542

* cited by examiner

*Primary Examiner* — Meredith A Long
(74) *Attorney, Agent, or Firm* — Keller Jolley Preece

(57) ABSTRACT

The present disclosure is directed toward systems, methods, and non-transitory computer readable media that dynamically modify content distribution campaigns based on triggering conditions and actions. In particular, systems described herein can provide a user interface for display to a publisher device that includes a plurality of selectable options for setting triggering conditions and/or actions. For example, the disclosed systems can utilize a machine learning model to generate suggested triggering conditions and/or actions for one or more content distribution campaigns of a provider. Moreover, the disclosed systems can generate custom rules based on selected triggering conditions and actions and apply the custom rules during execution of digital content campaigns. For instance, the disclosed systems can monitor performance of content campaigns, detect triggering conditions, and dynamically modify digital content campaigns based on actions corresponding to the triggering conditions.

20 Claims, 17 Drawing Sheets

DYNAMICALLY MODIFYING DIGITAL CONTENT DISTRIBUTION CAMPAIGNS BASED ON TRIGGERING CONDITIONS AND ACTIONS

BACKGROUND

Recent years have seen significant advances in hardware and software platforms for disseminating content to remote client devices through digital content distribution systems. For instance, publishers can now seamlessly execute content distribution campaigns for entertainment, advertising, or business purposes by distributing digital content over the Internet to a plurality of client devices corresponding to various target audiences.

Although conventional content distribution systems allow individuals and businesses to disseminate digital content through computer networks, they also have a number of drawbacks. For example, conventional content distribution systems are generally rigid, and provide little flexibility during execution of a digital content campaign to respond to changing conditions. To illustrate, conventional content distribution systems often require publishers to create custom pipelines that periodically query conventional content distribution systems (e.g. via an API) regarding performance of a digital content distribution campaign. Then, based on information regarding the performance of the digital content distribution campaign, conventional content distribution systems often require merchants to manually adjust various campaign parameters to effectuate a change to the content distribution campaign.

This approach is inefficient for both publishers and computing systems implementing conventional content distribution systems. Indeed, conventional content distribution systems expend significant computing resources to repeatedly respond to queries and manage requests for modifications from various publishers. Similarly, publishers expend significant computing resources submitting queries, analyzing performance data, and manually requesting modifications. Moreover, conventional content distribution systems lead to slower system response times, delayed performance data, and inefficient and delayed modifications to content distribution campaigns.

These and other problems exist regarding conventional content distribution systems for distributing content to client devices over computer networks.

SUMMARY

One or more embodiments described below provide benefits and/or solve one or more of the foregoing or other problems in the art with systems, methods, and computer readable media that dynamically modify a content distribution campaign in real time during execution of the content distribution campaign based on selectable triggering conditions and corresponding actions. For instance, in one or more embodiments, the disclosed systems provide a user interface that allows publishers to select triggering conditions and corresponding actions to perform during a content distribution campaign. Indeed, in one or more embodiments, the disclosed systems generate suggested triggering conditions and corresponding actions (utilizing a machine learning model) to assist the user in improving performance of a content distribution campaign. The disclosed systems can then utilize selected triggering conditions and actions to notify publishers regarding changes during a digital content campaign and to dynamically adjust digital content campaigns in real time.

To illustrate, in one or more embodiments, the disclosed systems provide a user interface comprising a plurality of selectable triggering conditions and actions corresponding to a content distribution campaign (e.g., suggested triggering conditions and actions generated by a machine learning model). Furthermore, the disclosed systems generate a custom rule for modifying the content distribution campaign based on triggering conditions and actions selected via the user interface. On executing the content distribution campaign, the disclosed systems monitor activity corresponding to the content distribution campaign to detect satisfaction of the triggering conditions. In response to detecting satisfaction of the triggering conditions, the disclosed systems automatically modify the content distribution campaign according to the actions in the custom rule. Thereafter, the disclosed systems automatically execute the modified content distribution campaign.

The disclosed systems provide a number of advantages over conventional content distribution systems. Indeed, the disclosed systems provide increased flexibility by providing a plurality of selectable triggering conditions and actions (e.g., suggested triggering conditions and actions identified by a machine learning model trained to identify triggering conditions and actions most likely to improve performance of a particular campaign). In particular, the disclosed systems can provide selectable triggering conditions and actions that publishers can utilize to uniquely tailor execution, modifications, and notifications during a digital content campaign. Furthermore, the disclosed systems can improve efficiency for implementing computing devices. Indeed, the disclosed systems can significantly reduce the computing resources expended by conventional systems to repeatedly respond to queries from publishers and manage modification requests. Similarly, the disclosed systems can significantly reduce the need for publishers to expend computing resources to submit queries, analyze performance data, and manually modify campaign parameters. Furthermore, by automatically modifying content distribution campaigns and notifying publishers based on previously selected triggering conditions and actions, the disclosed systems can improve response time, reduce delay, and provide efficient, timely modifications to content distribution campaigns.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

Various embodiments will be described and explained with additional specificity and detail through the use of the accompanying drawings in which.

DETAILED DESCRIPTION

Figure 1:
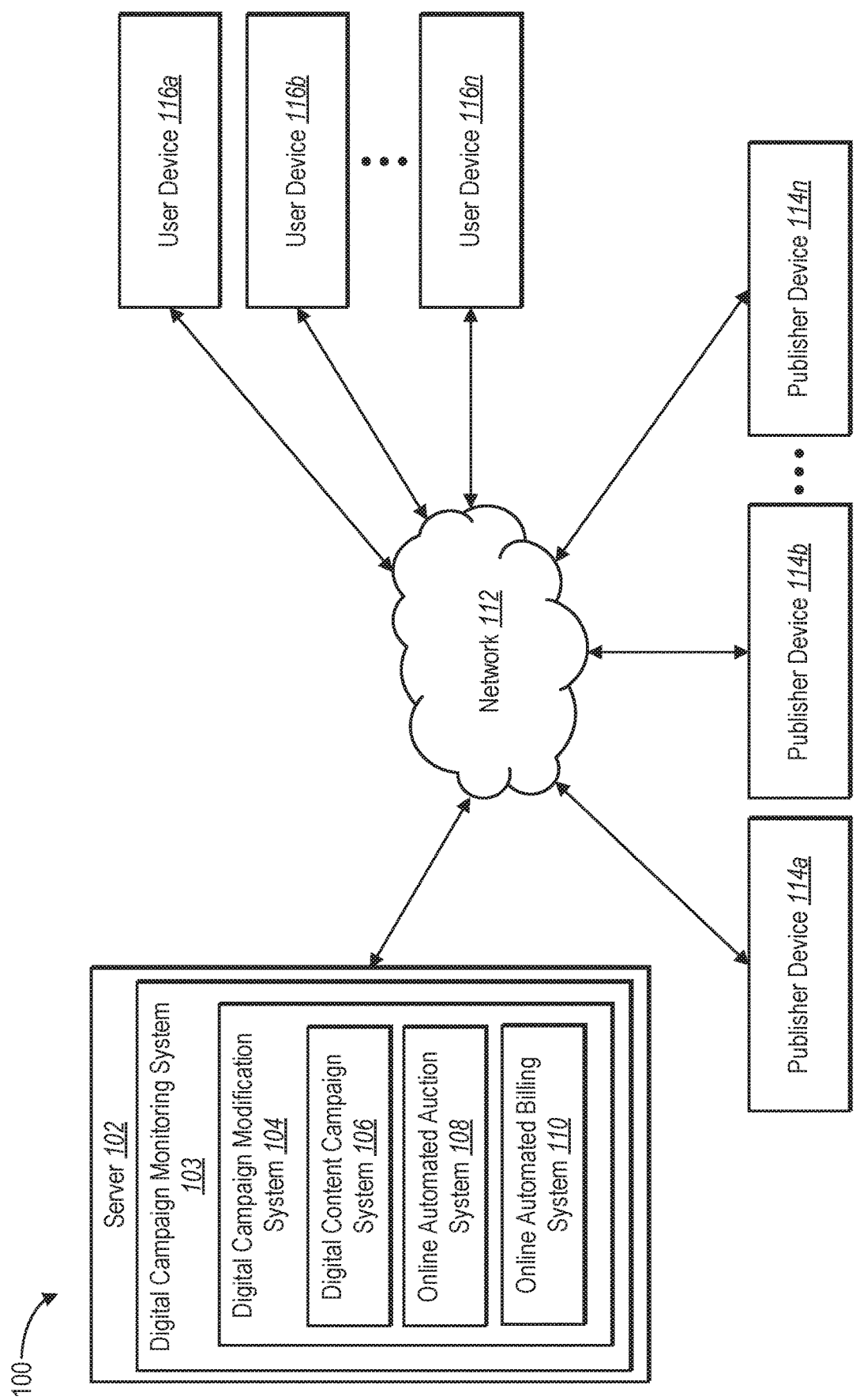
FIG. 1 illustrates a schematic diagram of a network environment in which a digital campaign modification system can be implemented in accordance with one or more embodiments.

One or more embodiments of the present invention include a digital campaign modification system that dynamically adjusts content distribution campaigns in real-time based on custom rules created from selectable triggering conditions and corresponding actions. In particular, in one or more embodiments, the digital campaign modification system provides a user interface with selectable options that allow digital publishers to customize and automate actions and notifications based on the performance of content distribution campaigns in real-time. For instance, in one or more embodiments, the digital campaign modification system generates suggested triggering conditions and corresponding actions utilizing a machine learning model trained based on historical content distribution campaigns. Accordingly, the digital campaign modification system provides publishers with the option to anticipate and automate actions during execution of a content distribution campaign without the need for constant manual monitoring and delayed responsive action.

For example, in one or more embodiments, the digital campaign modification system provides for display, to a publisher device, a user interface that includes a plurality of triggering conditions and a plurality of actions corresponding to a content distribution campaign. Additionally, in response to user selection of a triggering condition and user selection of an action, the digital campaign modification system can generate a custom rule for modifying the content distribution campaign (i.e., a custom rule that reflects the selected triggering condition and action). Furthermore, upon executing the content distribution campaign, the digital campaign modification system can monitor activity corresponding to the content distribution campaign to detect satisfaction of the triggering condition. In response to detecting satisfaction of the triggering condition, the digital campaign modification system can then automatically modify the content distribution campaign (e.g., modify one or more campaign parameters) according to the action of the custom rule. Moreover, in one or more embodiments, the digital campaign modification system then executes the modified content distribution campaign.

As just mentioned, in one or more embodiments, the digital campaign modification system provides a user interface for display to a publisher device that includes a plurality of triggering conditions and actions corresponding to one or more content distribution campaigns. In particular, in one or more embodiments, the digital campaign modification system provides the user interface to a publisher when setting up content distribution campaign(s) to provide options for creating custom rules. To illustrate, the digital campaign modification system can provide a user interface with triggering conditions, such as, a budget threshold (e.g., an amount of budget expenditure), a cost threshold (e.g., a level of cost for purchasing an impression opportunity to provide digital content), or an impressions threshold (e.g., a number of impression opportunities purchased). Similarly, the digital campaign modification system can provide a variety of actions via the user interface, such as, a modify budget action (e.g., change budget allocated for a content distribution campaign), a modify digital content action (e.g., change one or more features of digital content provided to user devices), a modify bid amount action (e.g., modify bids for an online auction to provide digital content to user devices), or a pause content distribution campaign action.

Furthermore, in one or more embodiments, the digital campaign modification system provides a user interface that includes one or more notification options. For instance, the digital campaign modification system can provide an option to provide a notification, such as, a message via a networking system or a call to a remote server. In addition, the notification option may be coupled with one or more triggering conditions such that satisfaction of the triggering condition automatically provides a notification according to the notification option.

As mentioned above, the digital campaign modification system can monitor activity corresponding to one or more content distribution campaigns. In particular, the digital campaign modification system may continuously monitor performance of content distribution campaigns to detect satisfaction of one or more triggering conditions. To illustrate, the digital campaign modification system can continuously monitor a digital content campaign and detect that a budget expenditure for a content distribution campaign has exceeded a threshold corresponding to a triggering condition.

Furthermore, as discussed above, in response to detecting satisfaction of a triggering condition, the digital campaign modification system can automatically modify content distribution campaigns (and/or provide various notifications). Specifically, the digital campaign modification system can automatically modify content distribution campaigns according to actions corresponding to a triggering condition. To illustrate, upon detecting that a content distribution campaign has exceeded a threshold budget expenditure corresponding to a triggering condition, the digital campaign modification system can apply an action corresponding to the triggering condition, such as modifying a bid amount to reduce additional expenditures.

As mentioned above, in one or more embodiments, the digital campaign modification system also suggests triggering conditions and/or actions. Specifically, the digital campaign modification system can generate a suggested triggering condition and corresponding suggested action utilizing a machine learning model. For example, the digital campaign modification system can train a machine learning model with a plurality of historical content distribution campaigns. Upon training the machine learning model, the digital campaign modification system can apply the trained machine learning model to a new content distribution campaign and provide suggested triggering condition and corresponding suggested actions for display to a publisher device.

The digital campaign modification system provides a number of advantages over conventional content distribution systems. For example, the digital campaign modification system can increase flexibility in relation to conventional systems. Indeed, by utilizing selectable triggering conditions and actions, the digital campaign modification system can uniquely tailor execution and modification of digital content distribution campaigns to the needs of a particular publisher. To illustrate, utilizing the digital campaign modification system a publisher can set multiple triggering conditions that correspond to multiple actions to automatically modify a content distribution campaign time according to the unique needs of that particular publisher. In this manner, the digital campaign modification system may flexibly adapt the digital content distribution campaign in real time based on detected satisfaction of triggering conditions.

Furthermore, the digital campaign modification system can improve efficiency for both publishers and other operators of the digital campaign modification system by reducing the amount of user initiated queries and modification requests. Indeed, as mentioned above, conventional systems generally require publishers to query performance data for a particular campaign, analyze the performance data, and then submit requests to modify one or more campaign parameters. The digital campaign modification system avoids the inefficiency and inconvenience of these conventional systems by providing (e.g., suggesting utilizing a machine learning model) selectable triggering conditions and actions, monitoring performance of a content distribution campaign, and then automatically modifying the content distribution campaign as triggering conditions are satisfied.

Additionally, the digital campaign modification system can also reduce computing resources. Indeed, by reducing the number of user-initiated queries and modification requests, the digital campaign modification system can reduce the storage and processing power required both by publisher computing systems and other computing systems utilized to implement the digital campaign modification system. For instance, the digital campaign modification system can reduce the computation cost of opening a communication channel, sending/receiving communications (i.e., queries and/or modification requests), and responding to the communications. Moreover, by utilizing triggering condition identified by the publisher, the digital campaign modification system can reduce computational resources required to monitor various content distribution campaigns. Indeed, rather than tracking a wide array of different features of a content distribution campaign in order to respond to publisher queries, the digital campaign modification system can focus resources by monitoring triggering conditions specifically identified by particular publishers for particular content distribution campaigns.

These advantages are particularly significant in the context of providing digital content in a real-time online automated auction environment. Indeed, as discussed below, the digital campaign modification system 104 can be implemented as part of an online automated auction that provides digital content to user devices within milliseconds of detecting an impression opportunity corresponding to the user devices. Because of the near-instantaneous nature of the real-time online automated auction environment, solutions that rely on non-technical, non-digital solutions are not feasible. The digital campaign modification system 104 can increase accuracy, efficiency, and flexibility of content distribution campaigns by modifying content distribution campaigns and providing digital content to user devices in accordance with the content distribution campaign within milliseconds of identifying impression opportunities.

As illustrated by the foregoing discussion, the present disclosure utilizes a variety of terms to describe features and advantages of the digital campaign modification system. Additional detail is now provided regarding the meaning of such terms. For instance, as used herein, the term "content distribution campaign" refers to a plurality of actions, rules, and/or processes for disseminating one or more content items. In particular, a content distribution campaign includes one or more content items (e.g., advertisements) and one or more campaign parameters for disseminating the one or more content items. To illustrate, a digital content distribution campaign includes a content item together with campaign parameters for bidding on impression opportunities (e.g., a bidding schedule, a maximum bid, or a minimum bid), sending content items to user devices (e.g., preferred distribution channels), or targeting particular user devices and/or users (e.g., a target audience or target user parameters).

Moreover, as used herein, the term "impression," refers to digital content retrieved from a source (e.g., via a remote server) to be served for a particular purpose (e.g., served in a content item slot or space to a user device). In particular, an impression corresponds to a countable event for when a content item is retrieved and served (e.g., regardless of whether a user views or otherwise interacts with the content item). Similarly, the term "impression opportunity" refers to an occasion or prospect to provide an impression to a user device. For instance, the term "impression opportunity" includes a vacant digital content slot (e.g., an advertising slot on a social networking news feed, website, or application) specific to a user of a user device, where the vacant digital content slot is available to be filled with digital content from a remote server.

Moreover, as used herein, the term "triggering condition" refers to an event, activity, incident, or occurrence. In particular, the term "triggering condition" includes an event, activity, incident or occurrence that initiates performance of an action. As mentioned above, a user interface can include a triggering condition. For example, a user interface can include a selectable element that reflects an event, activity, incident, or occurrence. To illustrate, a threshold triggering condition can include a budget threshold, a cost threshold, or an impressions threshold. In one or more embodiments, triggering conditions are time-sensitive. For example, a time sensitive triggering condition may include a time of day requirement, day of the week requirement, or month of the year requirement.

The term "action," as used herein, refers to a step, performance, or process. In particular, the term action includes a step, performance, or process initiated in response to satisfaction of a triggering condition. As mentioned, a user interface can include (e.g., portray) an action. For example, a user interface can include a selectable element that reflects a step, performance, or process to take in response to satisfaction of a triggering condition. To illustrate, actions may include a modify budget action (e.g., increase or decreasing the total budget, or changing budget allocated between two different content distribution campaigns), a modify target audience action (e.g., modifying a target parameter, such as age, for user of client devices targeted to receive digital content), a modify bid amount action (e.g., modify a maximum bid or minimum bid or other bid schedule), a modify digital content action (e.g., change a color of digital content provided to client devices or swap out a first digital content item for a second digital content item), or a pause content distribution campaign action.

As used herein, the term "custom rule" includes an instruction or rule corresponding to at least one content distribution campaign. In particular, a custom rule includes one or more triggering conditions and one or more actions corresponding to the one or more triggering conditions. Thus, the digital campaign modification system can receive user interaction via a user interface with a triggering condition and an action and generate a custom rule from the triggering condition and the action. In particular, the digital campaign modification system can generate a custom rule that includes performing the action upon detecting satisfaction of the triggering condition.

As used herein, the term "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, clustering, K-nearest neighbors, K-means, random forest learning, dimensionality reduction algorithms, boosting algorithms, artificial neural networks, deep learning, etc. Thus, a machine-learning model makes high-level abstractions in data by generating data-driven predictions or decisions from the known input data.

Turning now to FIG. 1, additional detail will be provided regarding an environment for implementing a digital campaign modification system. Specifically, FIG. 1 illustrates a schematic diagram of one embodiment of an exemplary system environment ("environment") 100 in which a digital campaign modification system 104 can operate. As illustrated in FIG. 1, the environment 100 can include a server 102, a network 112, a plurality of publisher devices 114a-114n, and a plurality of user devices 116a-116n. Furthermore, the server 102 includes a digital campaign monitoring system 103, which includes the digital campaign modification system 104. Moreover, the digital campaign modification system 104 also includes a digital content campaign system 106, an online automated auction system 108, and an online automated billing system 110. The server 102, the network 112, the plurality of publisher devices 114a-114n, the plurality of user devices 116a-116n, and the other components of the environment 100 may be communicatively coupled with each other either directly or indirectly (e.g., through the network 112).

As just mentioned, and as illustrated in FIG. 1, the environment 100 can include the plurality of publisher devices 114a-114n and the plurality of user devices 116a-116n. The plurality of publisher devices 114a-114n and the plurality of user devices 116a-116n may comprise a variety of different computing devices, such as personal computers, laptop computers, mobile devices, smartphones, tablets, special purpose computers, TVs, or other computing devices. As illustrated in FIG. 1, the plurality of publisher devices 114a-114n, the plurality of user devices 116a-116n, and/or the server 102 may communicate via the network 112. Additional detail regarding the plurality of publisher devices 114a-114n, plurality of user devices 116a-116n, and the network 112 are discussed in greater detail below in relation to FIG. 11.

Moreover, as illustrated by FIG. 1, the environment 100 also includes the server 102. The server 102 may generate, store, receive, and/or transmit any type of data. The server 102 can comprise a communication server or a web-hosting server. In one or more embodiments, the server 102 may comprise a data server. Additional details regarding the server 102 will be discussed below in relation to FIG. 11.

As illustrated, in one example, the server 102 can host the digital campaign monitoring system 103. The digital campaign monitoring system 103 can manage the monitoring of a digital content distribution campaign, and schedule the implementation of custom rules applicable to the digital content distribution campaign. For instance, the digital campaign monitoring system 103 can monitor bids, winning bids, spend, billing, user interactions with digital content, or other activities corresponding to a digital content distribution campaign.

Moreover, the server 102 can host the digital campaign modification system 104. As mentioned above, the digital campaign modification system 104 can dynamically modify a content distribution campaign based on one or more triggering conditions and actions. The digital campaign modification system 104, as further illustrated in FIG. 1, can include the digital content campaign system 106, the online automated auction system 108, and the online automated billing system 110. As an overview, the digital content campaign system 106 manages content distribution campaigns as well as serves content items to user devices. The online automated auction system 108 facilitates online auctions between different publishers and/or different content distribution campaigns. Moreover, the online automated billing system 110 collects actual revenue attributable to (e.g., billed to or able to be billed to) a publisher (e.g., an advertiser).

While FIG. 1 shows the digital campaign monitoring system 103, the digital campaign modification system 104, the digital content campaign system 106, the online automated auction system 108, and the online automated billing system 110 located on the server 102, each of these systems can be implemented on the same or different servers. For example, in one or more embodiments, the digital campaign monitoring system 103 is implemented via a first set of servers, the digital campaign modification system 104 is implemented via a second set of servers, the online automated auction system 108 is implemented by a third set of servers, and/or the online automated billing system 110 is implemented via a fourth set of servers.

Moreover, although FIG. 1 illustrates the digital campaign monitoring system 103 implementing the digital campaign modification system 104, and the digital campaign modification system 104 implementing the digital content campaign system 106, the online automated auction system 108, and the online automated billing system 110, in some embodiments, different arrangements are utilized. For example, in one or more embodiments, the digital campaign monitoring system 103 can be implemented (in whole or in part) within one or more of the digital campaign modification system 104, the digital content campaign system 106, the online automated auction system 108, and the online automated billing system 110. For example, in one or more embodiments, the digital campaign monitoring system 103 is implemented (e.g., hosted) as part of the digital campaign modification system 104. Similarly, the digital campaign modification system 104 can be implemented (in whole or in part) within one or more of the digital content campaign system 106, the online automated auction system 108, and the online automated billing system 110.

Although FIG. 1 illustrates one of the server 102, it will be appreciated that the server 102 can represent any number of computing devices. Similarly, although FIG. 1 illustrates a particular arrangement of the server 102, network 112, plurality of publisher devices 114a-114n, and plurality of user devices 116a-116n, various additional arrangements are possible.

By way of example, in one or more embodiments the publisher device 114a sends a request to the server 102 to generate a custom rule as part of a content distribution campaign. The digital campaign modification system 104, via the server 102, can provide, to the publisher device 114a, a user interface with triggering conditions and actions for generating a custom rule, in addition to other campaign parameters for a content distribution campaign. In particular, the server 102 can utilize a machine learning model to generate suggested triggering conditions and/or actions and provide the suggested triggering conditions and/or actions for display via the publisher device 114a. The publisher device 114a can detect user interaction with triggering conditions and/or actions and send the publisher input to the server 102. In response, the digital campaign modification system 104, via the server 102, can generate a custom rule associated with a digital content campaign for the publisher. Moreover, the digital campaign modification system 104 can utilize the digital content campaign system 106 to execute the digital content campaign for the publisher.

In implementing the digital content campaign, the digital campaign modification system 104 can monitor impression opportunities at various user devices and provide digital content to the various user devices in accordance with the publisher campaign parameters. For example, the user device 116a can send a request to the server 102 (e.g., via a social networking application) for digital content. The digital content campaign system 106 can identify an impression opportunity corresponding to the user device 116a (e.g., an advertising slot within a social networking feed of the social networking application). In response, the digital content campaign system 106 can provide information regarding the impression opportunity (e.g., user characteristics and other information regarding the advertising slot) to the online automated auction system 108. The online automated auction system 108 can determine bids for the impression opportunity corresponding to the user device 116a based on campaign parameters provided by various publishers. The online automated auction system 108 can further determine a winning bid and winning publisher for the impression opportunity. The digital content campaign system 106 can then provide digital content corresponding to the winning publisher to the user device 116a. Furthermore, the digital campaign modification system 104 can monitor user interaction at the user device 116a with the digital content and provide information to the online automated billing system 110 to determine a publisher to bill.

As mentioned above, the digital campaign modification system 104 can continuously monitor execution of a digital content campaign over time and determine when one or more triggering conditions have been satisfied. For example, the digital campaign modification system 104 can determine that a triggering condition received from the publisher device 114a has been satisfied (e.g., a particular budget amount has been spent) and, in response, perform an action corresponding to the triggering condition. For example, the digital campaign modification system 104 can lower a bid amount for utilization with the content distribution campaign via the online automated auction system 108. Moreover, the digital campaign modification system 104 can then execute the modified content distribution campaign.

In one or more embodiments, the digital campaign modification system 104 can continuously monitor execution of a digital content campaign but limit the number and/or rate of modifications applied to a digital content campaign. For example, in one or more embodiments, the digital campaign modification system 104 applies a rule application threshold to limit the number (or frequency) of actions and modifications applied to a digital content campaign. Specifically, the digital campaign modification system 104 can apply a rule application threshold that limits the number of actions/rules that can be automatically applied within a particular unit of time. More specifically, the digital campaign modification system 104 can verify if the rule application threshold rate has been reached prior to automatically performing the corresponding action. For example, the digital campaign modification system 104 can apply a rule application threshold that limits the digital campaign modification system 104 to one action per five minutes (and thus limit modifications to one action within a five minute interval, even if the digital campaign modification system 104 detects additional triggering conditions).

As illustrated by the previous example embodiment, the digital campaign modification system 104 may be implemented in whole, or in part, by the individual elements 102-116n of the environment 100. Although FIG. 1 illustrates the digital campaign modification system 104 implemented with regard to the server 102, it will be appreciated that components of the digital campaign modification system 104 can be implemented in any of the components of the environment 100. For example, in one or more embodiments, the digital campaign modification system 104 can be implemented at least in part on the publisher device 114a.

Figure 2A:
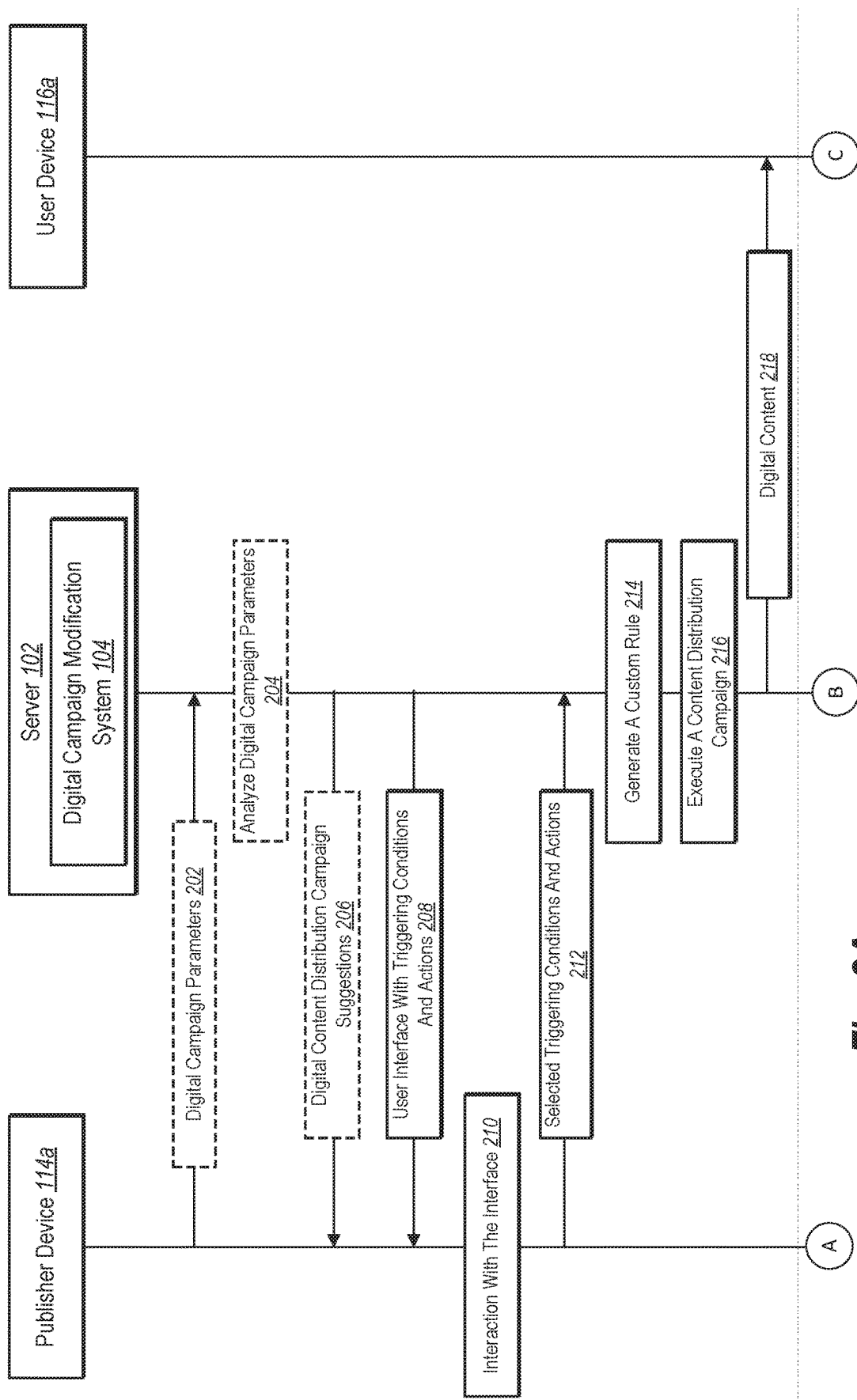
FIGS. 2A-2B illustrate a sequence diagram of a plurality of acts in a method of dynamically modifying a content distribution campaign in accordance with one or more embodiments.
Figure 2B:
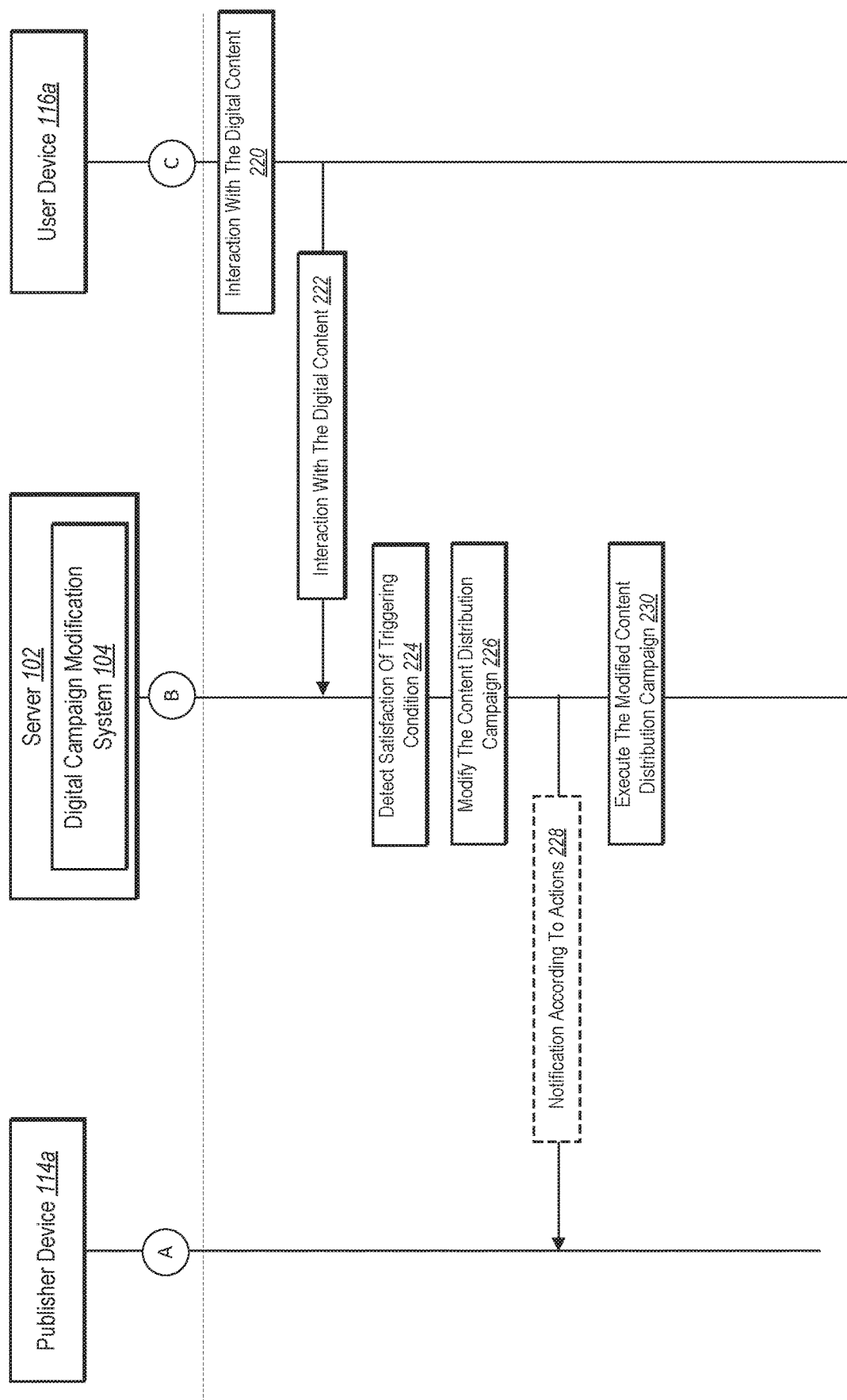

Turning now to FIGS. 2A-2B, additional detail will be provided regarding dynamically modifying a content distribution campaign in accordance with one or more embodiments of the digital campaign modification system 104. In particular, FIGS. 2A-2B illustrate a sequence of acts 202-230 performed by the digital campaign modification system 104 for generating and applying custom rules corresponding to a digital content campaign. Although FIGS. 2A-2B show the digital campaign modification system 104 residing on the server 102, the digital campaign modification system 104 can reside in part on the publisher device 114a, the server 102, and the user device 116a to perform the acts 202-230. In particular, as discussed in more detail below, the digital campaign modification system 104 can comprise computer-executable instructions that, when executed by the publisher device 114a, the server 102, and/or the user device 116a, cause the publisher device 114a, the server 102, and/or the user device 116a to perform the acts 202-230 shown in the sequence diagram of FIGS. 2A-2B.

As illustrated in FIG. 2A, the digital campaign modification system 104 can perform the act 202 of receiving digital campaign parameters. Specifically, the act 202 can include sending data associated with a digital content distribution campaign from the publisher device 114a to the server 102. For example, the server 102 can receive campaign parameters that include digital content (e.g., advertisements), a target audience (e.g., targeting parameters for particular users), a budget, bidding schedule, distribution avenues (e.g., preferred avenues for distribution of digital content, such as preferred websites or applications), a campaign duration, and goals. The act 202 can also include receiving information regarding the publisher, such as business size, industry, products or services offered, revenue, etc.

Upon receiving the digital campaign parameters, the digital campaign modification system 104 performs the act 204 of analyzing the digital campaign parameters (and/or other information regarding the publisher). In particular, the act 204 can include utilizing a machine learning model to analyze the digital campaign parameters and generate suggestions for the digital content distribution campaign. For example, the act 204 can include accessing a machine learning model trained utilizing a plurality of (historical) content distribution campaigns and corresponding content distribution campaign performance data. Furthermore, the act 204 can include utilizing the trained machine learning model to generate suggested triggering conditions and/or suggested actions. Additional detail regarding training and utilizing a machine learning model to generate suggestions is provided below in relation to FIGS. 7-8.

As illustrated in FIG. 2A, the digital campaign modification system 104 also performs the act 206 of providing the digital content distribution campaign suggestion to the publisher device 114a. For instance, the act 206 can include sending data associated with the digital campaign parameters received at the act 202, to the publisher device 114a. In particular, the act 206 can include providing the suggestions for display to the publisher device 114a as part of a user interface.

For example, as shown in FIG. 2A, the digital campaign modification system 104 can perform the act 206 as part of performing the act 208 of sending a user interface with triggering conditions and actions to the publisher device 114a. In relation to the act 208, the server 102 can provide an interface with a variety of interactive elements to enable a publisher to select triggering conditions and/or actions for a custom rule. For instance, the act 208 can include providing a user interface that includes a plurality of selectable triggering condition elements and selectable action elements. Indeed, the user interface can include elements for adding or removing triggering conditions, actions, notifications, and/or a rate of monitoring.

As illustrated in FIG. 2A, after the digital campaign modification system 104 sends the user interface (e.g., with triggering conditions and actions) to the publisher device 114a, the digital campaign modification system 104 utilizes the publisher device 114a to perform the act 210 of receiving interaction with the user interface. Specifically, the publisher device 114a can receive user input from the publisher via the user interface. For example, the publisher device 114a can receive user interaction with (e.g., user selection of) triggering conditions and actions portrayed in the user interface.

After receiving the interaction with the user interface at the act 210, the digital campaign modification system 104 can perform act 212 of sending the selected triggering conditions and actions (e.g., an indication of the selected triggering conditions and actions) from the publisher device 114a to the server 102. Moreover, upon receiving an indication of the selected triggering conditions and actions, the digital campaign modification system 104 performs the act 214 of generating a custom rule. Specifically, the digital campaign modification system 104 utilizes at least the triggering conditions and actions received at the act 212 to generate the custom rule.

To provide a specific example, in one or more embodiments, the publisher device 114a selects a triggering condition of click-through-rate dropping below 0.25 and an action of stopping delivery of digital content (e.g., a publisher may be uncertain how digital content will perform and wants to stop delivering the digital content when the click-through-rate drops below 0.25). The publisher device 114a can provide the triggering condition and the action to the server 102, and the digital campaign modification system 104 couples the selected triggering condition with its corresponding selected action to generate a custom rule: stopping delivery of the digital content when the click-through-rate drops below 0.25. In this manner, the digital campaign modification system 104 can combine the selected triggering conditions and actions into an executable rule associated with at least one digital content distribution campaign.

Furthermore, the act 214 can also include generating a custom rule for a plurality of triggering conditions and actions. For example, in one or more embodiments, the custom rule can include a plurality of triggering conditions, wherein the individual triggering conditions differ. For instance, two triggering conditions associated with the custom rule may each relate to when the cost per impression opportunity reaches a certain threshold, but differ in the magnitude of the threshold (e.g., when the cost is greater than $0.50, as compared to when cost is greater than $1.00). In this manner, the triggering conditions may stagger correlated actions automatically with gradual increases or decreases.

As just mentioned, performing the act 214 can include generating the custom rule associated with a plurality of actions. Indeed, a custom rule can include two different actions for one or more triggering events. To illustrate, where the cost exceeds a particular threshold, the custom rule can include a first action for modifying a maximum bid amount and a second action for modifying a budget amount.

While the foregoing examples illustrate custom rules with the triggering conditions and actions, the custom rule may also include additional elements. For instance, the custom rule may also include a rate of monitoring and/or notifications as described above.

As illustrated in FIG. 2A, the digital campaign modification system 104 also performs the act 216 of executing a content distribution campaign. The act 216 can include a variety of processes and acts for delivering digital content of the digital content distribution campaign to a target audience. For example, as discussed above, the act 216 can include monitoring user devices for impression opportunities and then conducting an online automated auction. In particular, the act 216 can comprise applying campaign parameters for the digital content campaign in an online automated auction to generate bids for the publisher. Furthermore, the act 216 can include identifying a winning bid and winning publisher from the online automated auction and identifying digital content from the winning publisher. Accordingly, the act 216 can include repeatedly analyzing impression opportunities, generating bids according to campaign parameters of the content distribution campaign, and then identifying digital content according to the campaign parameters of the digital content campaign.

As shown in FIG. 2A, the digital campaign modification system 104 also performs the act 218 of delivering the digital content to the user device 116a. In particular, the server 102 can deliver the digital content according to the campaign parameters received from the publisher device 114a. For example, the server 102 can identify an impression opportunity associated with the user device 116a, execute an online automated auction for the impression opportunity, identify the publisher associated with the publisher device 114a as a winning bidder, select digital content (e.g., an advertisement) to provide to the user device 116a according to the campaign parameters provided via the publisher device 114a, and then provide the digital content to the user device 116a. Although the foregoing examples refers to only one user device 116a, the act 218 can also include delivery of various digital content items to the plurality of user devices 116a-116n.

As illustrated in FIG. 2B, after the digital campaign modification system 104 sends the digital content, the user device 116a performs the act 220 of receiving interaction with the digital content. For example, the user may interact with an application running on the user device 116a (e.g., a networking application) to select (e.g., click) the digital content, visit a website corresponding to the digital content, or purchase an item corresponding to the digital content. The digital campaign modification system 104 can identify these user interactions at the user device 116a. Moreover, as shown, the digital campaign modification system 104 can perform the act 222 of providing an indication of the interaction with the digital content to the server 102.

While only one user device 116a is shown in FIG. 2B, the digital campaign modification system 104 can provide digital content and identify user interactions with the plurality of user devices 116a-116n. For example, the plurality of user devices 116a-116n may each receive digital content designated for delivery to each device and each device may perform the act 220 of receiving interaction with the digital content. Then, the plurality of user devices 116a-116n can each perform the act 222 of sending the interaction with the digital content to the server 102.

As shown in FIG. 2B, after performing the act 222, the digital campaign modification system 104 performs the act 224 of detecting satisfaction of a triggering condition. Specifically, the act 224 includes monitoring progress of a content distribution campaign (e.g., monitoring number of winning bids, budget allocation, and/or user interactions with digital content) and detecting satisfaction of a triggering condition in the custom rule associated with the digital content distribution campaign. For instance, the custom rule generated at the act 214 can include a triggering condition setting when the cost exceeds a threshold value. In this case, if the cost at an online automated auction at the server 102 exceeds the threshold value, then the digital campaign modification system 104 will detect satisfaction of the triggering condition. Similarly, the custom rule generated at the act 214 can include a threshold number of user interactions with digital content. The digital campaign modification system 104 can detect (e.g., from the interactions received at the act 222) satisfaction of the triggering condition.

As shown in FIG. 2B, after performing the act 224, the digital campaign modification system 104 performs the act 226 of modifying the content distribution campaign. In particular, the digital campaign modification system 104 applies the actions correlated with the triggering conditions as defined in the custom rule. For example, the custom rule may include a targeting condition of the daily budget spent exceeding $30 and a corresponding action of decreasing maximum bids for an online automated auction to $0.75. In response to detecting that the daily budget spent exceeds $30, the digital campaign modification system 104 can automatically decreases the maximum bids to $0.75.

As discussed above, the digital campaign modification system 104 can also apply a rule application threshold in performing the act 224. For example, the digital campaign modification system 104 can determine whether a rule application threshold has been satisfied before modifying the content distribution campaign. For instance, continuing the foregoing example, the digital campaign modification system 104 may wait to perform (or ignore) the action of automatically decreasing the maximum bids to $0.75 upon determining that a rule application threshold rate has already been exceeded (i.e., there has already been an action performed in response to a triggering condition in the preceding five minutes).

As mentioned above, in one or more embodiments, the custom rule may also include notification(s) settings. If indicated, the notification(s) settings in the custom rule may instruct the digital campaign modification system 104 to deliver a notification to the publisher. The notification may include a message indicating that the automatic modification of the digital content distribution campaign occurred. For example, the digital campaign modification system 104 may deliver to the publisher device 114a a message notification indicating that the maximum bid was reduced to $0.75.

As illustrated in FIG. 2B, the digital campaign modification system 104 performs act 230 of executing the modified content distribution campaign. For example, continuing the previous example, the digital campaign modification system 104 can execute the modified content distribution campaign by identifying an impression opportunity and limiting a maximum bid amount at an online auction to $0.75. As mentioned above, executing the modified content distribution campaign can include performing a variety of different processes, rules, or steps in accordance with a particular action selected by a publisher.

The method described in relation to FIGS. 2A-2B is intended to be illustrative of one or more methods in accordance with the present disclosure, and is not intended to limit potential embodiments. Alternative embodiments can include additional, fewer, or different acts than those articulated in FIGS. 2A-2B. For instance, as shown in FIG. 2A, in some embodiments, the acts 202-206 are optional (e.g., are not performed). For instance, in some circumstances the digital campaign modification system 104 performs the act 208 by including suggested triggering conditions and/or actions for a publisher to utilize. In other embodiments, the digital campaign modification system 104 provides a user interface (e.g., a general list of possible triggering conditions and/or actions) without any explicit suggestions.

Additionally, the acts described herein may be performed in a different order, may be repeated or performed in parallel with one another, or may be performed in parallel with different instances of the same or similar acts. For example, while the illustration in FIG. 2A shows the act 216 occurring after the act 214, the acts may occur in an alternative order. For example, when the digital campaign modification system 104 previously executed the digital content distribution campaign, and subsequently makes a custom rule. In this instance, the digital campaign modification system 104 provides the subsequently made custom rule for implementation in association with the previously executed digital content distribution campaign. In this manner, performing the act 216 can include executing the content distribution campaign, now associated with the custom rule generated at the act 214.

Figure 3A:
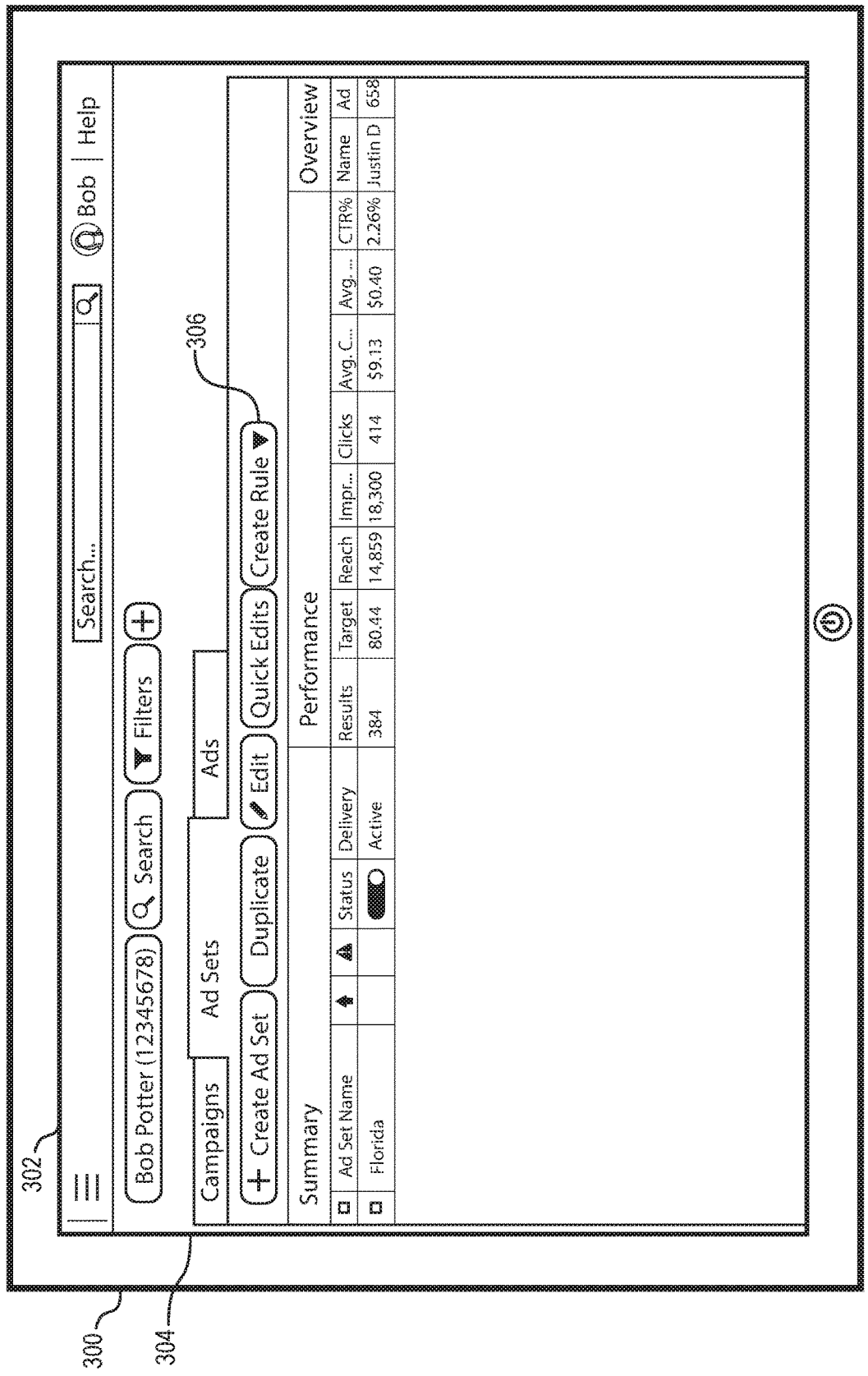
FIGS. 3A-3D illustrate a computing device and user interface for generating a custom rule in accordance with one or more embodiments.
Figure 3B:
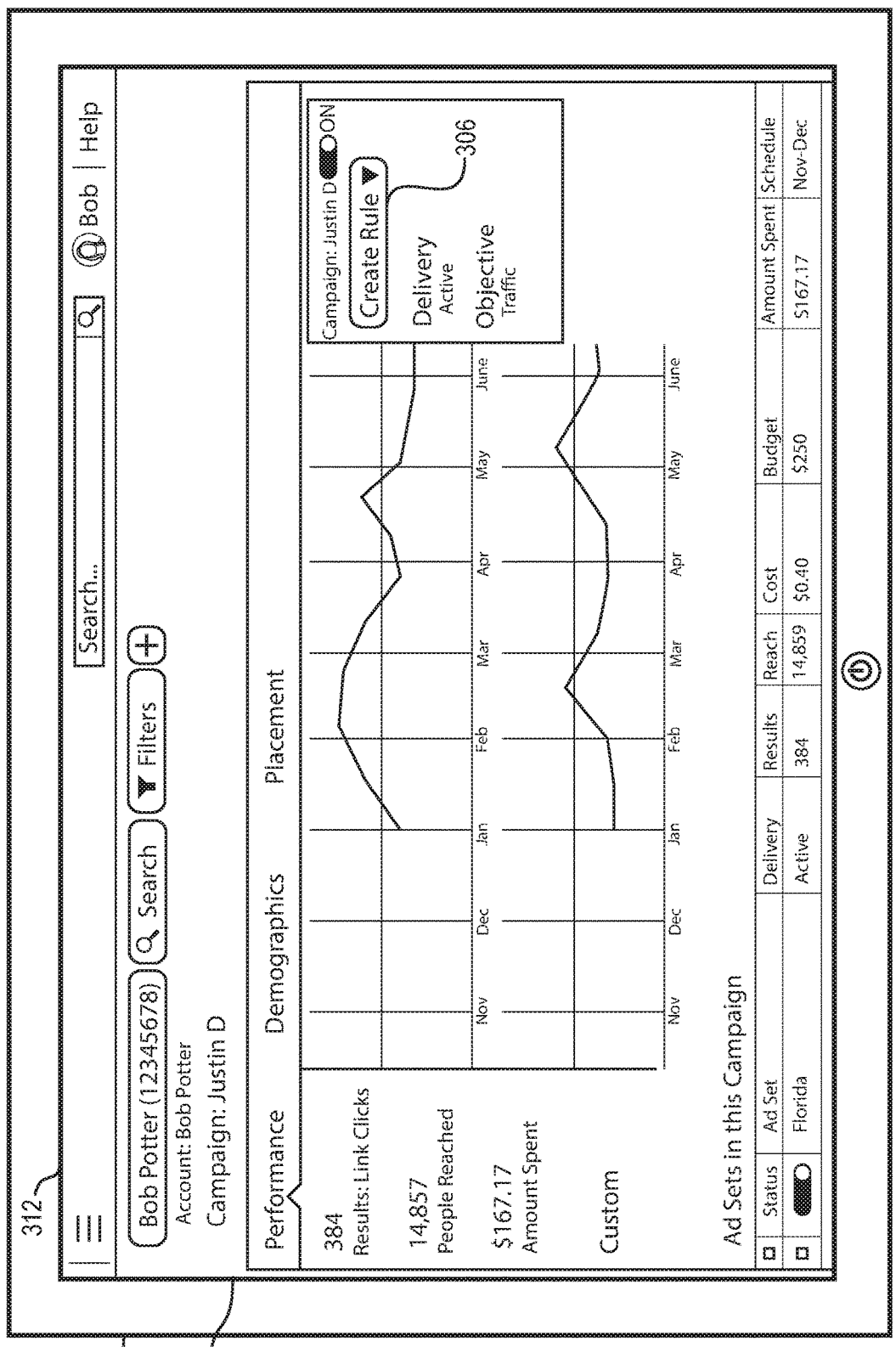
Figure 3C:
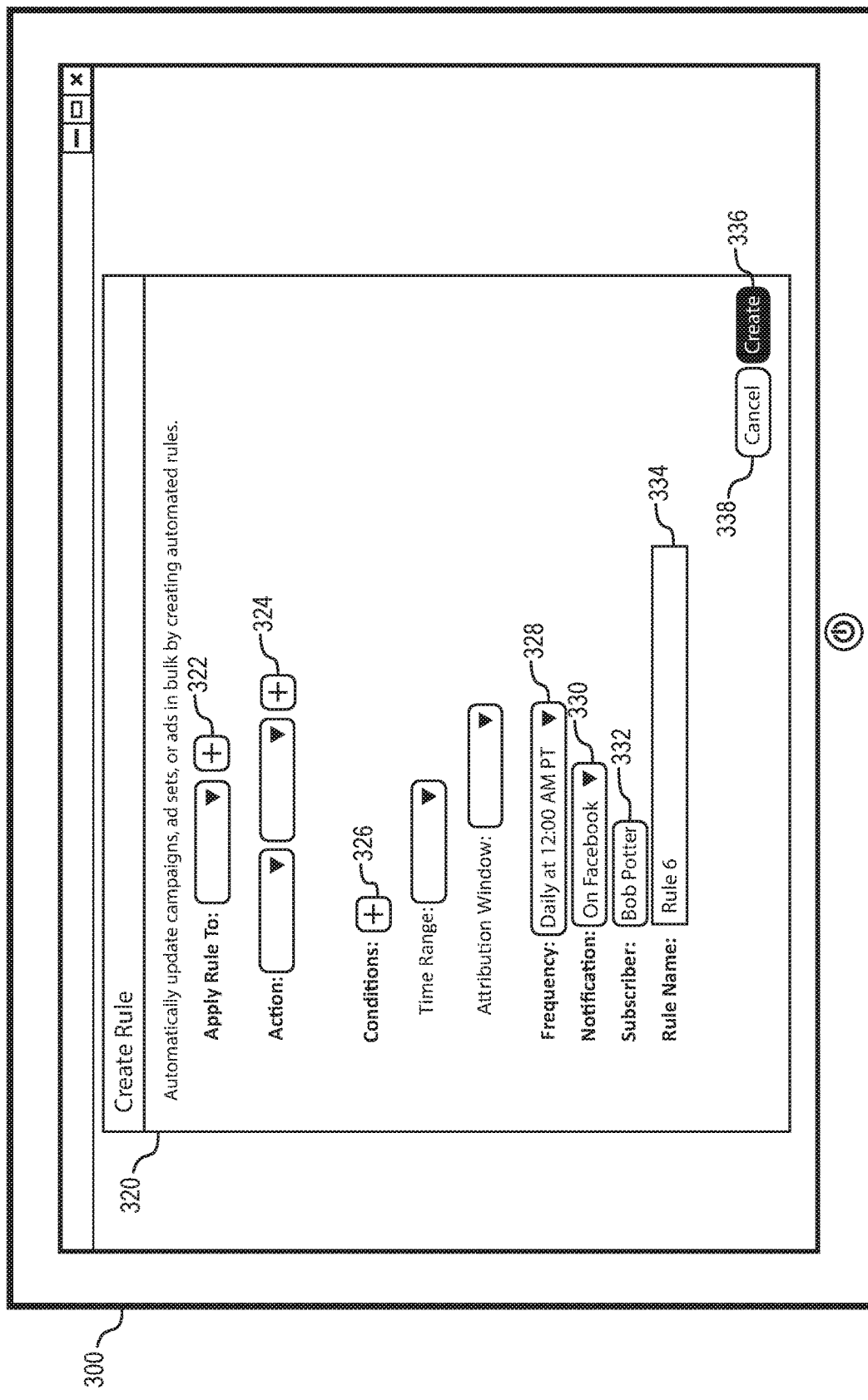
Figure 3D:
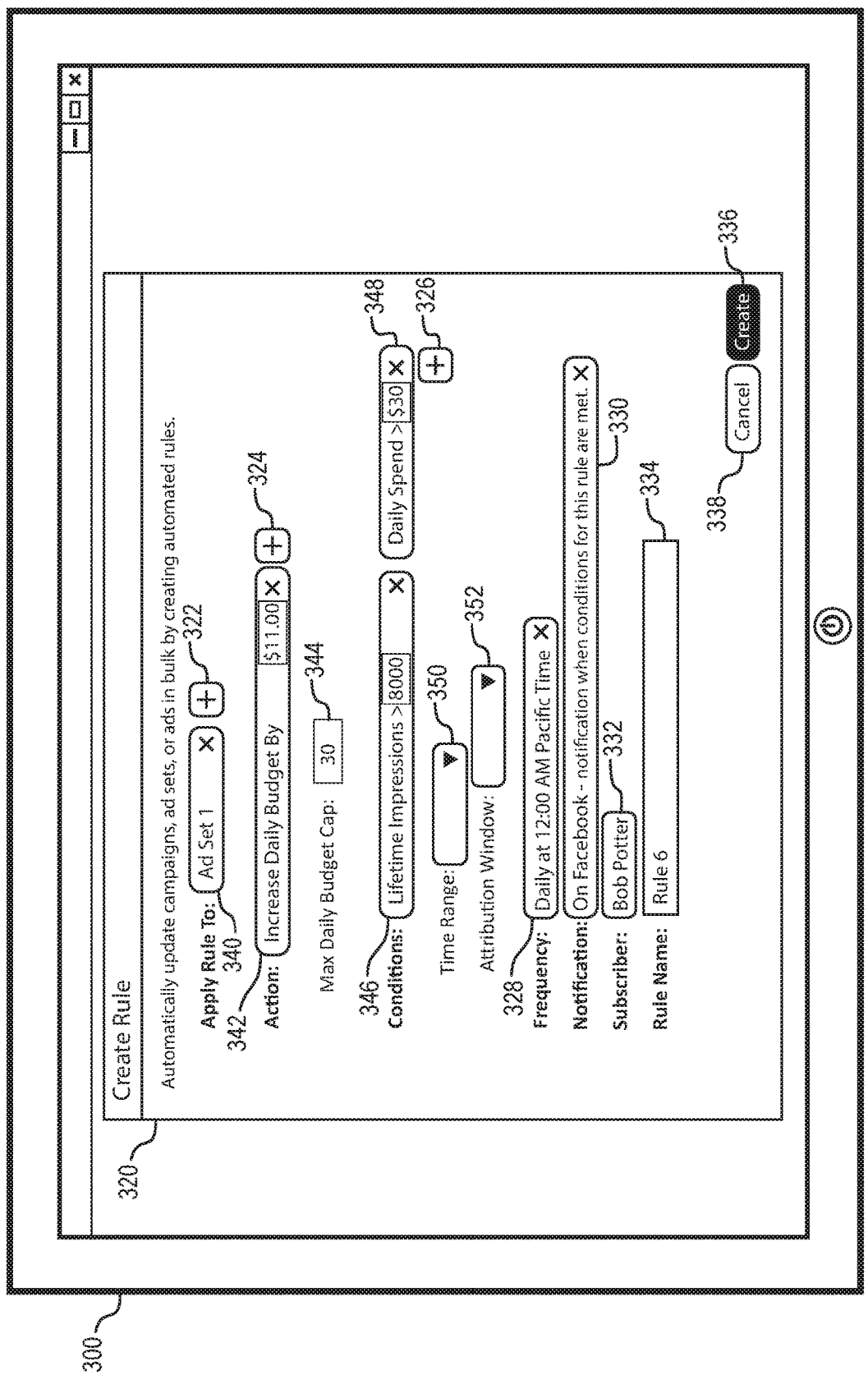

Turning now to FIGS. 3A-3D, additional detail will be provided regarding user interfaces for designing digital content campaigns and setting triggering conditions and actions in accordance with one or more embodiments of the digital campaign modification system 104. In particular, FIGS. 3A, 3B illustrate user interfaces for designing and reviewing content distribution campaigns that include a selectable element for generating a custom rule. FIGS. 3C, 3D illustrates a user interface (e.g., upon user interaction with the selectable element for generating a custom rule) for selecting triggering conditions and actions.

For example, FIG. 3A illustrates a publisher device 300 (e.g., an exemplary embodiment of the publisher device 114a) running an application 302 that includes a user interface 304. In one or more embodiments, the application 302 allows a publisher to create content distribution campaigns (e.g., advertising campaigns) with corresponding campaign parameters. Indeed, as illustrated, the user interface 304 includes tabs for generating "Campaigns," "Ad Sets," and "Ads." Each of the tabs include elements for generating campaigns, ad sets, and ads (i.e., digital content). Thus, in relation to the tab "Ad Sets" the user interface 304 includes an element to "Create Ad Set" and selectable elements to modify an existing ad set (e.g., the ad set for "Florida").

Notably the user interface 304 also includes the custom rule element 306. In particular, the custom rule element 306 is labeled "Create Rule." Upon user interaction with the custom rule element 306, the digital campaign modification system 104 can provide one or more additional selectable elements and/or user interfaces for generating a custom rule with triggering conditions and/or actions. For example, upon user interaction with the custom rule element 306, the digital campaign modification system 104 can provide a drop-down menu with triggering conditions and actions (e.g., suggested triggering conditions and/or actions for a particular ad set and/or campaign).

Similarly, FIG. 3B illustrates the publisher device 300 running an application 312 that includes a user interface 314. In one or more embodiments, the application 312 allows a publisher to analyze performance of a content distribution campaign. For example, the user interface 314 includes various elements (e.g., graphs, tables, and charts) reflecting various performance metrics relative to a content distribution campaign.

The user interface 314 also includes the custom rule element 306. As mentioned above, upon user interaction with the custom rule element 306, the digital campaign modification system 104 can provide additional selectable elements and/or user interfaces for generating a custom rule. Thus, as shown in FIGS. 3A, 3B, the digital campaign modification system 104 can provide elements for generating a custom rule in a variety of different applications, including applications for generating or analyzing content distribution campaigns.

As mentioned above, the digital campaign modification system 104 can also generate a user interface comprising triggering conditions and rules. For example, FIG. 3C illustrates the publisher device 300 portraying a user interface 320. In one or more embodiments, the digital campaign modification system 104 provides the user interface 320 upon detecting user interaction with the custom rule element 306. Accordingly, the user interface 320 can be provided as part of the application 302, the application 312, and/or some other application.

As illustrated in FIG. 3C, the user interface 320 includes a variety of selectable elements for generating a custom rule. In particular, the user interface 320 includes a selectable element 322 for adding content distribution campaigns or portions of content distribution campaigns applicable to a custom rule (in addition to a drop-down element for selecting applicable content distribution campaigns or portions of content distribution campaigns). The user interface 320 also includes a selectable element 324 for adding and/or selecting actions, a selectable element 326 for adding and/or selecting triggering conditions, a selectable element 328 for adding and/or selecting a frequency (i.e., a rate of monitoring for satisfaction of triggering conditions), and a selectable element 330 for adding and/or selecting a notification. The user interface 320 also includes fields for identifying information associated with a custom rule, including a subscriber 332 and rule name 334. Moreover, the user interface 320 also includes administrative elements to create 336 or cancel 338 the creation of the custom rule.

As indicated above, in one or more embodiments, the user interface 320 includes the selectable element 322 for adding content distribution campaigns (or portions of content distribution campaigns) applicable to a custom rule. Indeed, as mentioned above, the digital campaign modification system 104 can apply a custom rule to multiple different content distribution campaigns or multiple parts of content distribution campaigns. For example, the digital campaign modification system 104 can apply a custom rule to a plurality of digital content items (e.g., advertising sets) in a content distribution campaign or a single digital content item (e.g., a single advertisement) in a content distribution campaign. Based on user interaction with the selectable element 322, the digital campaign modification system 104 can adjust the applicability of a custom rule to all or a portion of content distribution campaigns.

Thus, in response to user interaction with the selectable element 322, the digital campaign modification system 104 can provide a plurality of digital content campaigns for display (e.g., a list of available digital content campaigns) or provide a plurality of different portions of a digital content campaign for display (e.g., a list of different digital content items). The publisher can select one or more digital content campaigns. In response, the digital campaign modification system 104 can apply a custom rule to the one or more selected digital content campaigns (e.g., monitor the one or more selected digital content campaigns for triggering conditions and apply actions to the one or more selected digital content campaigns upon satisfaction of the triggering conditions).

Similarly, user interaction with selectable elements 322, and 326 allows a publisher to add actions and corresponding triggering conditions to a particular custom rule. For example, a publisher can interact with the selectable element 322 and add an action to increase a daily budget or increase a per impression budget. Similarly, a publisher can interact with the selectable element 326 and add a triggering condition corresponding to the action, such as detecting that lifetime impressions exceed a particular number or that an amount of budget spent exceeds a particular value. Thus, a publisher can add multiple actions and corresponding triggering conditions to a particular custom rule via interaction with the selectable elements 322, and 326.

As illustrated in FIG. 3C, the user interface 320 can also include elements for additional details regarding a triggering condition. For example, the user interface 320 can include a selectable element for a time range applicable to the triggering condition (e.g., within the last month or year). Similarly, the user interface can include a selectable element for a particular approach to attribution (e.g., a method or approach to attributing conversions or events to a digital content item or digital content campaign such that monitoring for the triggering condition is performed according to the publisher's preferences).

Utilizing the added actions and corresponding triggering conditions, the digital campaign modification system 104 also defines a custom rule. For example, the digital campaign modification system 104 defines what data to monitor according to the added triggering conditions. Similarly, the digital campaign modification system 104 defines what action to take upon detection of satisfaction of the added triggering condition by referring to the corresponding added actions.

As shown in FIG. 3C, the user interface 320 also includes a selectable element 328 for adding and/or selecting a frequency. Based on user interaction with the selectable element 320 the digital campaign modification system 104 can adjust a monitoring frequency to a particular custom rule. For example, a publisher can add a monitoring frequency of Daily at 12:00 AM Pacific Time to the particular custom rule. In this manner, the publisher may instruct the digital campaign modification system 104 to check for satisfaction of any added triggering conditions at a particular frequency (i.e., rate of monitoring) for the particular custom rule.

As shown in FIG. 3C, the user interface 320 also includes a selectable element 330 for adding a notification. Based on user interaction with the selectable element 330, the digital campaign modification system 104 can add a notification for a particular custom rule via the selectable element 330. Specifically, the publisher can indicate a preferred method of receiving a notification from the digital campaign modification system 104 when the triggering conditions are satisfied. By way of example, the added notification instruction can direct the digital campaign modification system 104 to send a notification to the publisher via a networking system.

As just mentioned, a publisher can interact with the user interface 320 to select actions, triggering conditions, and other features. FIG. 3D shows user interface 320 upon receiving various selections via the computing device 300. Specifically, FIG. 3D illustrates publisher selections via the elements 322-334.

For example, FIG. 3D illustrates publisher selections made via the selectable element 322. Specifically, the user interface 320 illustrates an ad set 340 (entitled "Ad Set 1"). Based on the selected ad set 340, the digital campaign modification system 104 applies the actions, triggering conditions, and other features selected via the user interface 320 to Ad Set 1. The digital video insertion system 104 can add one or more additional digital content campaigns (or portions of digital content campaigns) based on additional user interaction. In this manner, a publisher can manage associations between a plurality of content distribution campaigns and a particular custom rule.

FIG. 3D also illustrates publisher selections made via the selectable element 324 for adding and/or selecting an action. Specifically, the user interface 320 illustrates an action 342 (which includes an action type, "Increase Daly Budget By," as well as an action quantity, "$11.00"). When adding an action type, a publisher may select from a plurality of selectable actions. If the action type selected requires a quantity, a publisher can use the field entry to provide a quantity associated with the type of action (e.g., a dollar figure, amount, or percentage).

In response to selection of different action types, the digital campaign modification system 104 can add selectable customization options within the user interface 320. For example, in response to selection of the "Increase Daily Budget By" action type, the digital campaign modification system 104 includes the max daily budget cap element 344. When the max daily budget cap 344 is available, a publisher can use the field entry location to supply a quantity for capping the max daily budget. After the publisher indicates the selected actions, the digital campaign modification system 104 will utilize the selected actions in generating the custom rule.

FIG. 3D also illustrates a publisher selection made via the selectable element 326 for adding and/or removing triggering conditions. For example, the user interface 320 includes the triggering condition 346 (i.e., "Lifetime Impressions>8000") and the second triggering condition 348 (i.e., "Daily Spend>$30"). The triggering condition 346 causes the digital campaign modification system 104 to monitor for when lifetime impressions for the content distribution campaign associated with the custom rule is greater than 8000. The second triggering condition 348 causes the digital campaign modification system 104 to monitor the content distribution campaign associated with the custom rule for when the daily dollar figure spent is greater than $30.00.

As shown, triggering conditions can include elements for both a triggering condition type and a triggering condition quantity (e.g., a triggering condition type of "Lifetime Impressions" and a triggering condition quantity of "8000"). In some embodiments, the publisher selects the triggering condition type from a plurality of selectable triggering condition types provided via the digital campaign modification system 104 (e.g., cost per mobile app install, percent of total budget spent, or daily clicks). In one or more embodiments, the publisher enters a quantity in a field entry location (e.g., a dollar figure, amount, or percentage). In this manner, the publisher can select triggering conditions that the custom rule will monitor.

When the publisher selects more than one triggering condition, the user interface 320 can provide additional options to the publisher. For example, the digital campaign modification system 104 can provide additional options defining a relationship between triggering conditions. To illustrate, the digital campaign modification system 104 can provide logical connectors (e.g., Boolean connectors), or sequence connectors (i.e., an ordering of priority). For example, the publisher can indicate that trigger condition 346 is logically connected with the "AND" requirement to the second triggering condition 348. Thus, the publisher can indicate that the custom rule will only be satisfied when both individual triggering conditions are satisfied.

The triggering conditions further comprise an option to indicate the time range 350. Specifically, the time range 350 can indicate the time span over which the digital campaign modification system 104 will calculate the triggering conditions (e.g., the monitored amounts of the content distribution campaign associated with the custom rule). By way of example, the publisher can select the time range of beginning on Jan. 1, 2017. With this selected time range, the digital campaign modification system 104 will calculate any values correlated to the content distribution campaign associated with the custom rule from that date up to the present. The time range 350 can comprise of a plurality of time ranges (e.g., varying start and stop dates, or discrete spans of time, such as 3 months).

The digital campaign modification system 104 further manages the triggering conditions via the attribution window 352. As briefly mentioned above, via the attribution window 352 the digital campaign modification system 104 can manage attribution for activity related to the content distribution campaign associated with the custom rule. For instance, the attribution window 352 can include an option to attribute interaction with digital content of the content distribution campaign associated with the custom rule if the interaction was one day after a user viewing the digital content, or twenty-eight days after interacting with the digital content (e.g., clicking on an advertisement). By identifying how the digital campaign modification system 104 will calculate attribution of interaction with digital content, the digital campaign modification system 104 is able to accurately monitor activity and detect triggering conditions.

FIG. 3D also illustrates the elements to create 336, or cancel 338 the creation of the custom rule. After the digital campaign modification system 104 creates the custom rule, it can utilize and apply the custom rule. For example, utilizing this and other custom rules (e.g., historical content distribution campaign data/historical custom rule data), the digital campaign modification system 104 can execute one or more digital content campaigns. Moreover, the digital campaign modification system 104 can utilize the digital content campaign and custom rules to generate suggestions for other publishers.

Figure 4:
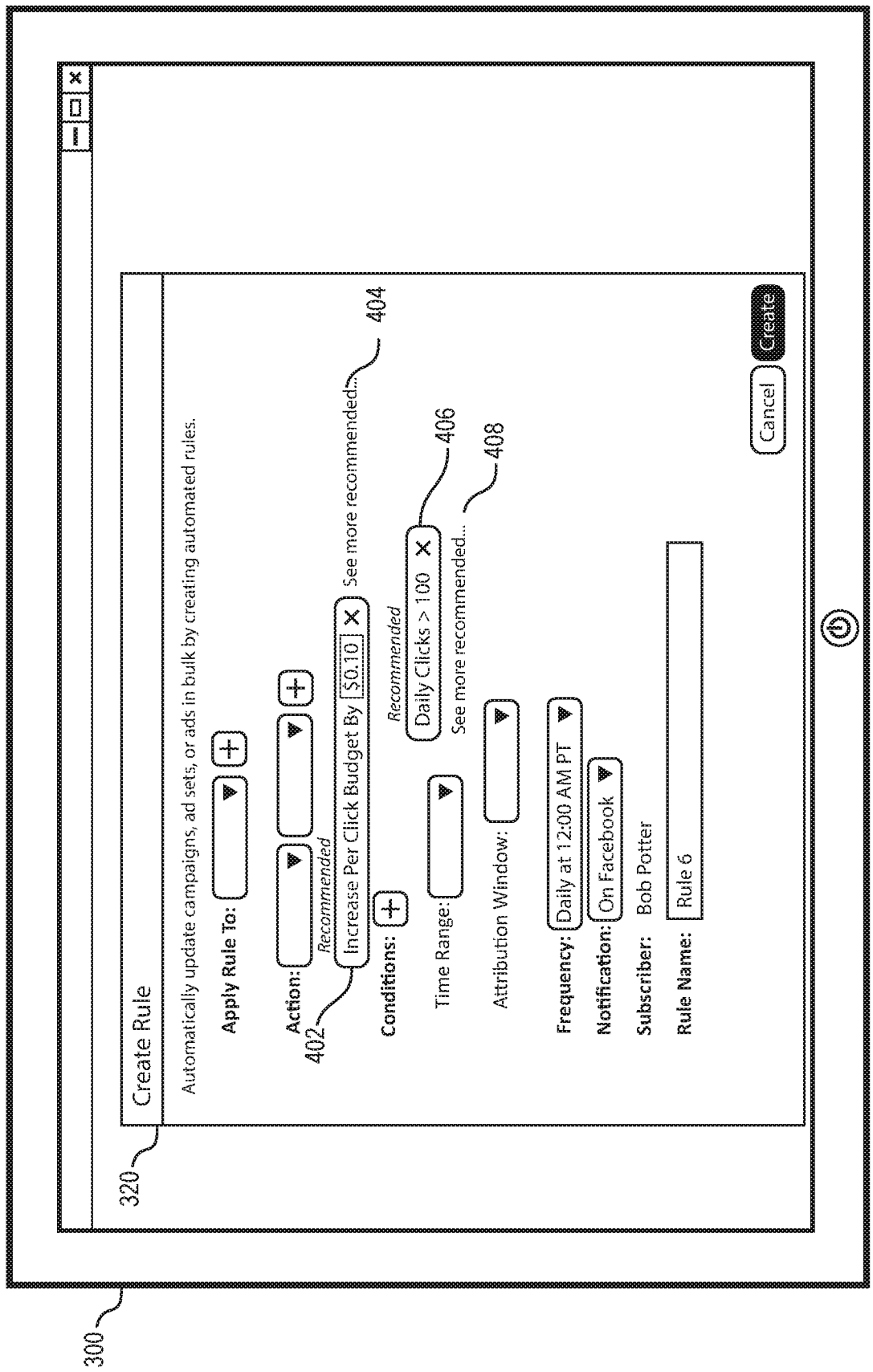
FIG. 4 illustrates a computing device and user interface for generating a custom rule, including suggested triggering conditions and actions in accordance with one or more embodiments.

Indeed, as discussed above, in one or more embodiments, the digital campaign modification system 104 generates suggestions for a publisher in relation to a digital content campaign. For example, FIG. 4 illustrates a user interface including suggested targeting characteristics and actions in accordance with one or more embodiments of the digital campaign modification system 104. Specifically, FIG. 4 illustrates the publisher device 300 with the user interface 320. The digital campaign modification system 104 generates and provides for display via the user interface 320 a plurality of suggestions, including a suggested action 402 and a suggested triggering condition 406.

As mentioned above, in one or more embodiments, the digital campaign modification system 104 can generate suggestions utilizing a machine learning model. In relation to FIG. 4, the digital campaign modification system 104 generates the suggested action 402 and the suggested triggering condition 406. For example, the digital campaign modification system 104 can identify features of one or more digital content campaigns of the publisher and analyze the features utilizing a machine learning model. The machine learning model can then suggest triggering conditions and/or actions for the digital content campaign.

For instance, in relation to FIG. 4, the digital campaign modification system 104 identifies a set of digital content items (e.g., the "Ad Set 1") utilized by a publisher as part of a digital content campaign. The digital campaign modification system 104 applies a machine learning model to various parameters applicable to the set of digital content items (e.g., campaign parameters of the digital content campaign). The machine learning model then generates suggested triggering conditions and corresponding actions (i.e., the suggested triggering condition 406 and the suggested action 402). Moreover, the digital campaign modification system 104 then provides the suggested triggering condition 406 and the suggested action 402 for display via the user interface 320. Additional details concerning generating and applying a machine learning model are provided in relation to FIGS. 7-8.

As just mentioned, the user interface 320 can include the suggested action 402. For example, the suggested action 402 may include a suggested indication of what to modify in a digital content campaign, and a suggested indication of the quantity to modify. As shown, for example, the suggested action 402 includes an "increase Per Click Budget By" action and a quantity of "$0.10." The publisher can accept and/or reject the suggested action 402 (e.g., by selecting the suggested action 402).

Additionally, the user interface 320 includes an additional action suggestion element 404. In response to user interaction with the additional action suggestion 404, the digital campaign modification system 104 provide additional action suggestions for display to the publisher.

The user interface 320 in FIG. 4 also shows a suggested triggering condition 406. Similar to the suggested action 402, the suggested triggering condition 406 includes a triggering condition type and quantity (i.e., "Daily Clicks" and "100). The publisher may select the suggested triggering condition 406 to add it to the plurality of triggering conditions associated with the custom rule. As also illustrated in FIG. 4, the user interface 320 can include an additional triggering condition suggestion element 408.

Although not illustrated in FIG. 4, the digital campaign modification system 104 can also generate other suggestions. For example, the digital campaign modification system 104 can suggest notifications and/or frequencies. For example, a frequency suggestion can include a suggested rate of monitoring (e.g., "hourly on weekdays Pacific Time"). Additionally, a notification suggestion can include a suggested notification option (e.g., "On Facebook when all triggering conditions are met").

The digital campaign modification system 104 can present suggestions to the publisher via the user interface 320 at a variety of different times (e.g., in response to a variety of events). For example, the digital campaign modification system 104 can present suggestions in response to publisher selection of elements on the user interface 304, the user interface 314, or the user interface 320. For example, when the publisher interacts with the custom rule element 306 via the user interface 304, or the user interface 314, the digital campaign modification system 104 can provide the user interface 320 with the suggestions. Moreover, in one or more embodiments, the digital campaign modification system 104 provides the suggestions to the publisher in response to the publisher selecting elements via the user interface 320 (e.g., interaction with the selectable element 322). More specifically, the digital campaign modification system 104 can provide the suggestion in response to the user selecting a recommended rule element, a triggering condition and/or action, or in response to some other event.

In addition to suggestions for individual triggering conditions and/or actions, the digital campaign modification system 104 can provide rule set recommendations. For example, in one or more embodiments, the digital campaign modification system 104 can generate a user interface for managing a plurality of digital content campaigns (or portions of digital content campaigns) and provide suggested custom rules applicable to the digital content campaigns (e.g., suggested custom rules that are new or existing for a particular publisher and/or digital content campaign)

Indeed, in one or more embodiments, the digital campaign modification system 104 utilizes a trained machine learning model to analyze a content distribution campaign data and generate a suggested rule. Moreover, the digital campaign modification system 104 analyzes existing custom rules to identify any existing custom rules that correlate to the suggested rule. The existing custom rules that correlate to the suggested rule are then provided to the publisher.

Figure 5:
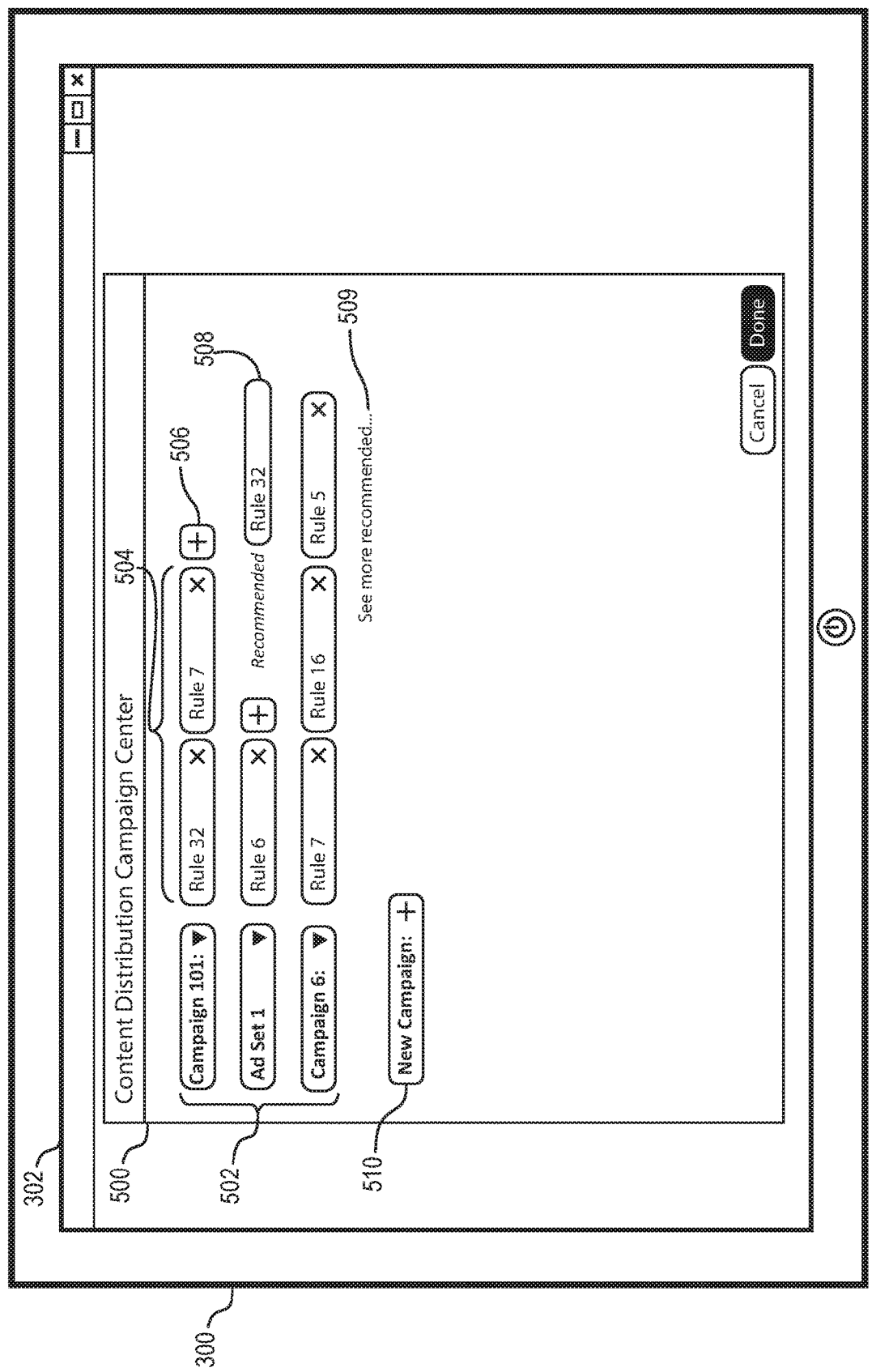
FIG. 5 illustrates a computing device and user interface for managing a content distribution campaign and suggested rules in accordance with one or more embodiments.

For example, FIG. 5 shows the publisher device 300 running the application 302 corresponding to a user interface 500. As shown, the user interface 500 includes a campaign list 502, associated rules 504, a suggested rule 508, and an additional rule recommendation element 509. In addition, the user interface 500 includes an option to add rule sets 506, and an option to create a new campaign 510.

As just mentioned, the user interface 500 may include a campaign list 502. In one or more embodiments, the campaign list 502 displays a list of the active campaigns associated with the publisher. In association with the campaign list, the user interface may display the associated rules 504. Specifically, the associated rules 504 reflect the rules the digital campaign modification system 104 is applying to the corresponding campaign on the campaign list 502.

Furthermore, the user interface 500 includes the suggested rules 508. The suggested rules 508 include at least one rule set recommended for association with the indicated campaign. The digital campaign modification system 104 may determine the suggested rule 508 from existing rules applicable to one or more digital content campaigns or as a new rule (as mentioned above). Accordingly, as shown, the digital campaign modification system 104 can provide a user interface for managing a plurality of content distribution campaigns and corresponding rules simultaneously, as well as providing suggested rules for one or more of the plurality of content distribution campaigns.

Figure 6:
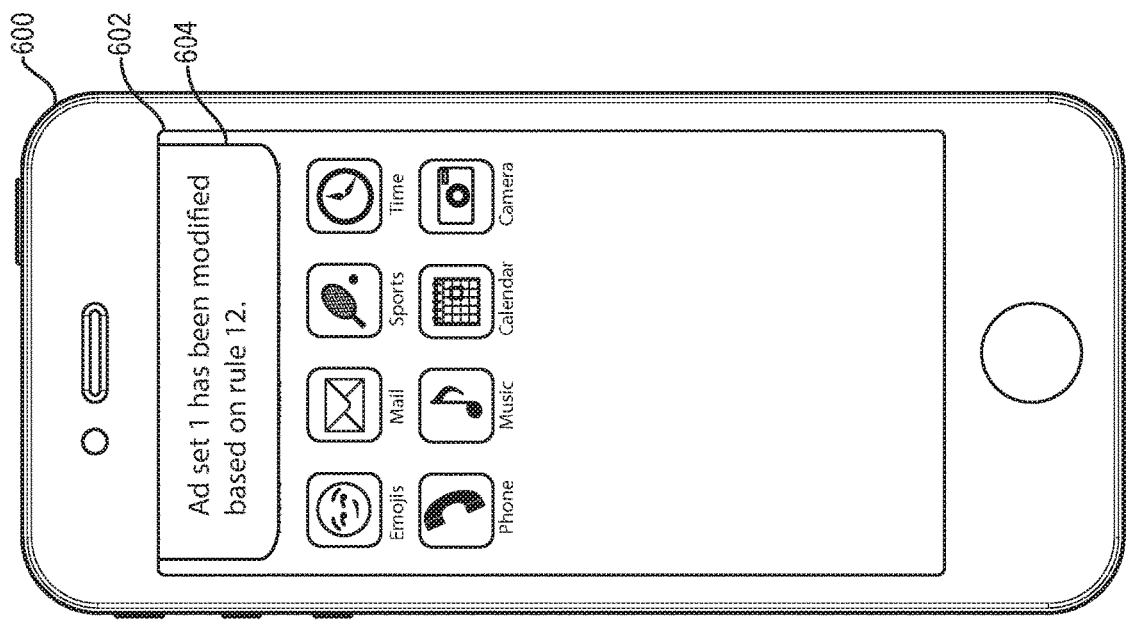
FIG. 6 illustrates a computing device and notification for indicating automatic modification of a content distribution campaign in accordance with one or more embodiments.

As mentioned above, the digital campaign modification system 104 can also provide one or more notifications to a publisher. Specifically, FIG. 6 illustrates a publisher device 600 receiving a notification 604 via the device display 602. For example, the publisher device 600 is one exemplary embodiment of the publisher device 114b. The digital campaign modification system 104 sends the notification 604 to the publisher device 600 based on monitoring a digital content campaign and detecting a triggering event. Specifically, in response to a triggering event, the digital campaign modification system 104 determines a notification corresponding to the triggering event and provides the notification 604 (e.g., as part of the act 228 discussed in relation to FIG. 2).

As shown in FIG. 6, the notification 604 is a notification delivered via a networking system (e.g., a social networking system or messaging system). Specifically, the notification is delivered via a networking system application on the publisher device 600 with the information "Ad Set 1 has been modified based on rule 12." The digital campaign modification system 104 determines what to include in the information displayed according to the notification options selected by the publisher.

While the displayed notification 604 is shown as a notification alert on the publisher device 600, the digital campaign modification system 104 can provide a notification for display on the publisher device 600 according to a variety of delivery methods. For example, the digital campaign modification system 104 can provide a notification via an email, SMS text, or notification alert. The publisher can select the delivery method when selecting the notification options.

Figure 7:
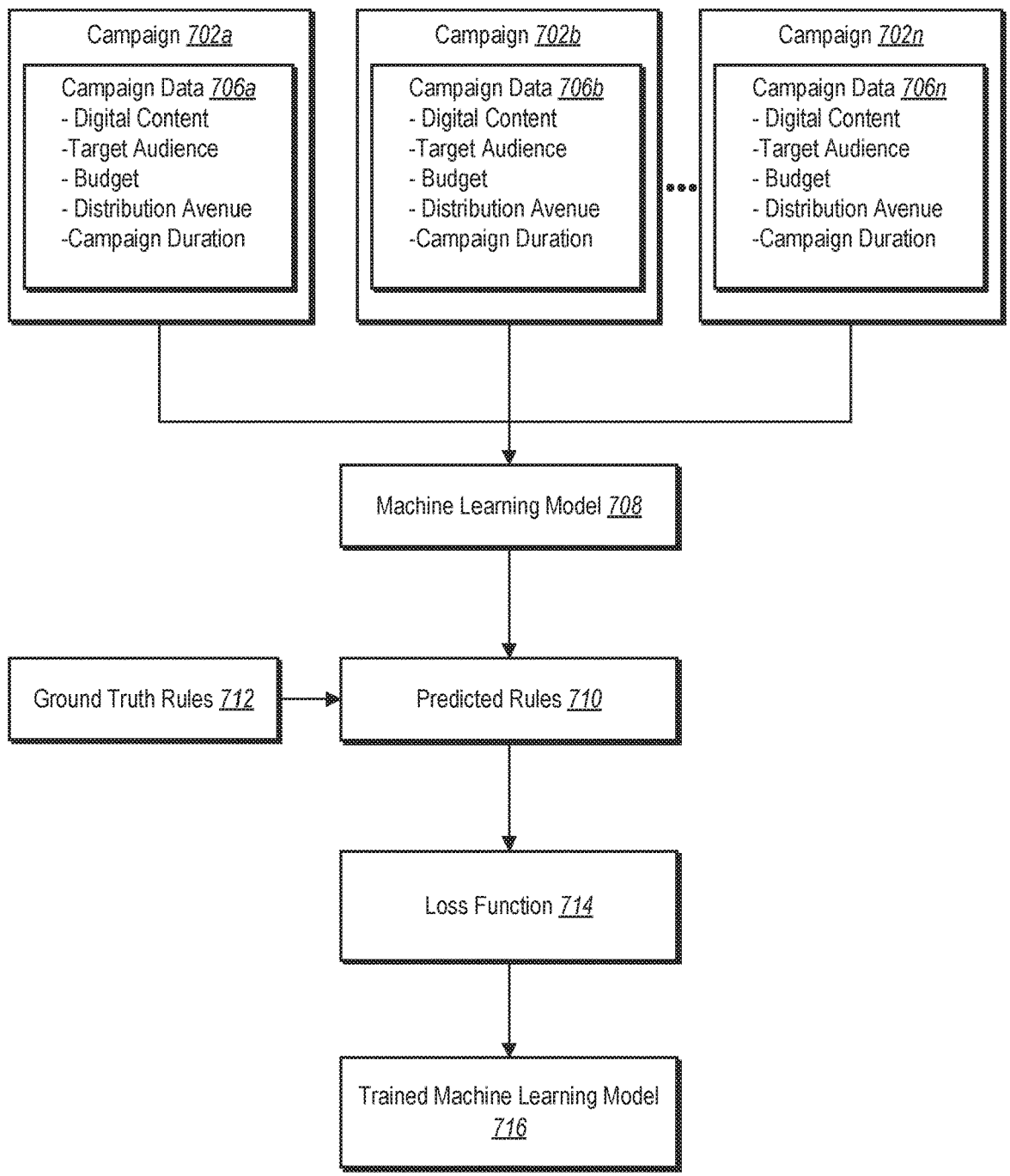
FIG. 7 illustrates an example sequence flow for training a machine learning model in accordance with one or more embodiments.

As mentioned above, in one or more embodiments the digital campaign modification system 104 utilizes a machine learning model to generate one or more suggestions. Indeed, the digital campaign modification system 104 can train the machine learning model to provide suggestions/recommendations to a publisher device. For example, FIG. 7 illustrates training a machine learning model in accordance with one or more embodiments. In particular, FIG. 7 shows a plurality of content distribution campaigns 702a-702n (e.g., historical content distribution campaigns), a machine learning model 708, ground truth rules 712, predicted rules 710, a loss function 714, and a trained machine learning model 716.

As shown, the digital campaign modification system 104 receives a plurality of content distribution campaigns 702a-702n. For example, the digital campaign modification system 104 can access a repository of historical data for content distribution campaigns implemented by a networking system. While FIG. 7 shows three content distribution campaigns, the plurality may include hundreds or thousands of digital content distribution campaigns.

As shown in FIG. 7, the plurality of content distribution campaigns 702a-702n includes campaign data 706a-706n. Campaign data can include a variety of characteristics or features of a content distribution campaign. For example, as shown in FIG. 7, the campaign data 706a-706n includes digital content, a target audience, a budget, a distribution avenue, and a campaign duration, corresponding to each content distribution campaign. The campaign data 706a-706n can include additional, fewer, or different information. For example, campaign data can include any variety of campaign parameters (e.g., bidding schedule or campaign goals) or data regarding the publisher implementing the digital content campaign (e.g., business size, industry, age, products or services offered, or revenue).

The training for the machine learning model 700 then passes the plurality of campaign data 706a-706n for each of the plurality of content distribution campaigns 702a-702n to the machine learning model 708 (e.g., applies the machine learning model 708 to the campaign data 706a-706n). The machine learning model 708 analyzes the campaign data 706a-706n and generates one or more predicted rules (e.g., the predicted rules 710).

The digital campaign modification system 104 trains the machine learning model 708 (i.e., generates the trained machine learning model 716) by comparing the predicted rules 710 with the ground truth rules 712. For example, digital campaign modification system 104 can access the ground truth rules 712 from a repository of historical data regarding the content distribution campaigns 702a-702n. Specifically, the digital campaign modification system 104 can identify ground truth rules selected and applied by publishers for the content distribution campaigns 702a-702n. The digital campaign modification system 104 compares the ground truth rules 712 with the predicted rules 710.

When comparing the predicted rules 710 to the ground truth rules 712, the training for the machine learning model 700 identifies a difference between the predicted rules 710 and the ground truth rules 712. For example, the digital campaign modification system 104 can apply a loss function 714 to determine a measure of error between the predicted rules 710 and the ground truth rules 712.

The digital campaign modification system 104 can then utilize the measure of error from applying the loss function 714 to generate the trained machine learning model 716. Specifically, the digital campaign modification system 104 can modify parameters of the machine learning model 708 to minimize the loss function 714. Thus, the machine learning model 708 can learn parameters that will minimize the difference between predicted rules and ground truth rules. In this manner, the digital campaign modification system 104 can train a machine learning model to predict suggested rules that correspond to ground truth rules.

Although FIG. 7 illustrates training a machine learning model to predict "rules," the digital campaign modification system 104 can train a machine learning model to predict custom rules and/or individual components of custom rules. For example, the digital campaign modification system 104 can generate a trained machine learning model that predicts triggering conditions, actions, frequency, and/or notifications.

In one or more embodiments, the digital campaign modification system 104 trains the machine learning model 708 to predict rules that improve the performance of a digital content campaign. For example, the digital campaign modification system 104 can identify digital content campaigns with elevated/improved performance metrics and utilize those digital content campaigns (e.g., campaign data from the digital content campaigns and corresponding ground truth rules) to generate the trained machine learning model 716. The machine learning model 716 can thus learn to predict rules that improve digital content campaigns.

The digital campaign modification system 104 can utilize the trained machine learning model 716 to provide suggestions/recommendations to the publisher. Indeed, in one or more embodiments, the digital campaign modification system 104 uses the trained machine learning model 716 to deliver a suggestion to a publisher with regard to a new digital content campaign. For example, FIG. 8 illustrates utilizing a trained machine learning model to generate a suggestion for a digital content campaign.

Figure 8:
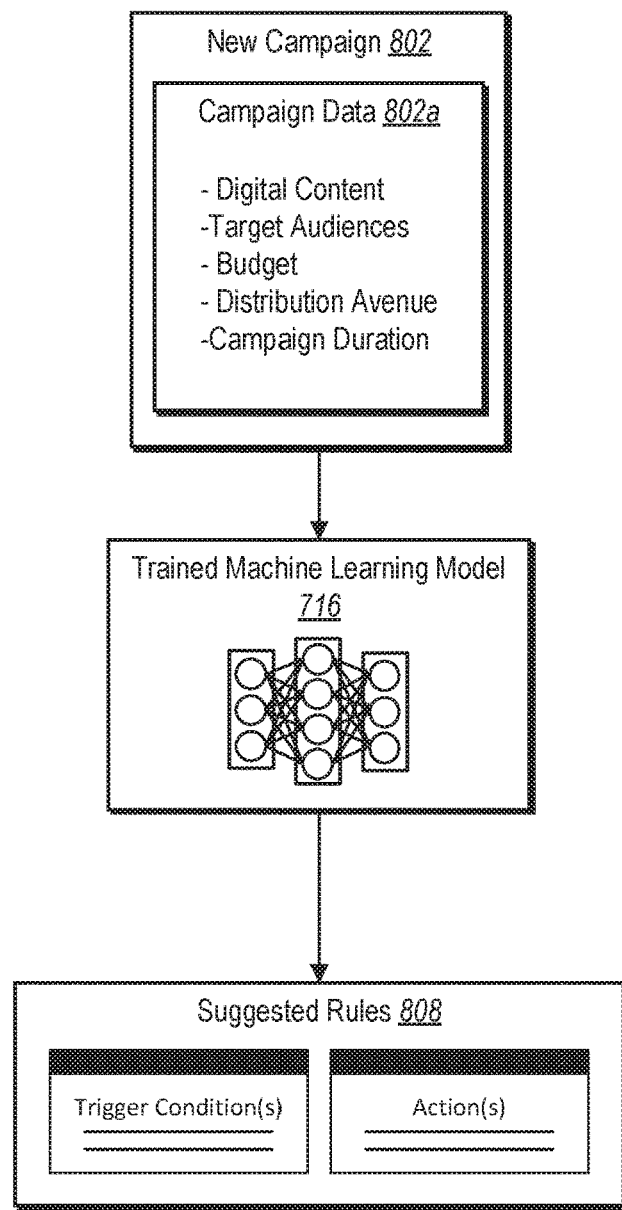
FIG. 8 illustrates an example sequence flow for applying a trained machine learning model to generate suggested rules in accordance with one or more embodiments.

Indeed, as shown in FIG. 8, the digital campaign modification system 104 applies the trained machine learning model 716 to a new campaign 802. Specifically, the digital campaign modification system 104 applies the trained machine learning model 716 to campaign data 802a corresponding to the new campaign 802. The campaign data 802a is specific to the new campaign 802 but can include any of the campaign data measures discussed above in relation to FIG. 7 (e.g., digital content, target audience, business information).

The trained machine learning model 716 analyzes the campaign data 802a and generates the suggested rules 808. Indeed, the trained machine learning model 716 applies the parameters learned during the training process (as discussed in relation FIG. 7) to generate the suggested rules 808 specific to the campaign data 802a. As shown, the suggested rules 808 can include trigger conditions and/or actions for the new campaign 802 (or other components of a custom rule, such as notifications, frequency, etc.). Moreover, as discussed above, the digital campaign modification system 104 can provide the suggestions/recommendations to the publisher (via a publisher device).

In one or more embodiments, the digital campaign modification system 104 can continuously train the machine learning model 708. For example, the digital campaign modification system 104 can detect custom rules (e.g., triggering conditions and/or actions) selected by a publisher. The digital campaign modification system 104 can then utilize the detected custom rules together with digital content campaigns associated with the publisher to further train the machine learning model 708.

Furthermore, in one or more embodiments, the digital campaign modification system 104 can update suggestions/recommendations (e.g., in real time or periodically). For instance, in response to receiving additional data associated with the campaign data 802a for the new campaign 802 the digital campaign modification system 104 can use the trained machine learning model 716 to update the suggested rules 808.

Figure 9:
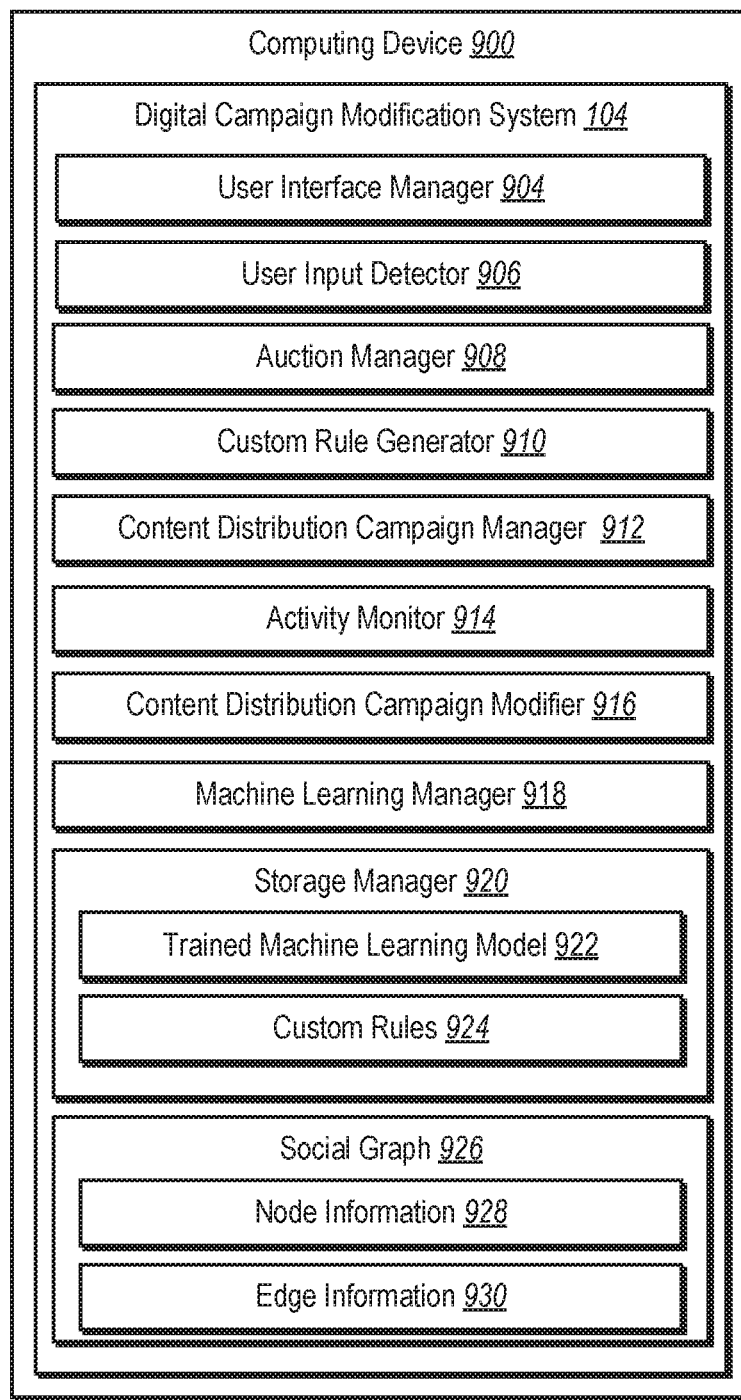
FIG. 9 illustrates a schematic diagram of a digital campaign modification system in accordance with one or more embodiments.

Turning now to FIG. 9, additional detail will be provided regarding components and functionality of the digital campaign modification system 104 in accordance with one or more embodiments. In particular, FIG. 9 illustrates a computing device 900 implementing the digital campaign modification system 104. The computing device 900 can include, for example, the server 102, the user devices 116a-116n, the publisher device 114a-114n, the computing device 300, and/or the publisher device 600.

As shown in FIG. 9, the digital campaign modification system 104 may include a user interface manager 904, a user input detector 906, an auction manager 908, a custom rule generator 910, a content distribution campaign generator 912, an activity monitor 914, a content distribution campaign modifier 916, a machine learning manager 918, a storage manager 920 (including a machine learning model 922 and custom rules 924), and a social graph 926 (including node information 928 and edge information 930).

As just mentioned, the digital campaign modification system 104 can include a user interface manager 904. The user interface manager 904 can provide, manage, and/or control a graphical user interface (or simply "user interface") for use with the digital campaign modification system 104 (e.g., the user interfaces 304, 314, 320, and 500). In particular, the user interface manager 702 may facilitate presentation of information by way of an external component of a client device. For example, the user interface manager 904 may display a user interface by way of a display screen associated with the client device.

The user interface may be composed of a plurality of graphical components, objects, and/or elements that allow a user to perform a function (e.g., a color modifier element, a message drafting element, or a message thread area as described above). The user interface manager 904 can present, via the client device, a variety of types of information, including text, images, video, audio, characters, standardized image characters, customized image characters, or other information. Moreover, the user interface manager 904 can provide a variety of user interfaces specific to any variety of functions, programs, applications, plug-ins, devices, operating systems, and/or components of the client device. Additional details with respect to various example user interface elements are described throughout with regard to various embodiments containing user interfaces.

As illustrated in FIG. 9, the digital campaign modification system 104 also includes the user input detector 906. The user input detector 906 can detect, identify, monitor, receive, process, capture, and/or record various types of user input. For example, the user input detector 906 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 906 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 906 can detect and identify various types of user interactions with user input devices, such as select events, drag events, scroll events, and so forth. The user input detector 906 can also detect a user interaction with respect to a variety of user interface elements. For example, the customized image character system 100 can detect user interaction with a triggering event and/or action to generate a custom rule.

As shown in FIG. 9, the digital campaign modification system 104 also includes the auction manager 908. Specifically, the auction manager 908 can operate, execute, and/or run an online automated auction. As described above, the auction manager 908 can generate bids based on campaign parameters of various publishers and identify a winning bidder.

As mentioned above, the digital campaign modification system 104 includes the custom rule generator 910. The custom rule generator 910 can create, determine, and/or generate custom rules, including triggering conditions and/or events. For example, the custom rule generator 910 can determine triggering conditions and/or actions selected by a publisher and generate a custom rule. Moreover, the custom rule generator 910 may associate the custom rule with one or more digital content distribution campaigns of the publisher.

As illustrated in FIG. 9, the digital campaign modification system 104 may also include the content distribution campaign generator 912. The content distribution campaign generator 912 may create and/or generate a content distribution campaign. For example, the content distribution campaign generator 912 can identify campaign parameters and digital content from a publisher and generate a content distribution campaign.

In addition, as shown in FIG. 9, the digital campaign modification system 104 can also include the activity monitor 914. The activity monitor 914 can monitor, track, and/or identify activity related to a content distribution campaign. For instance, the activity monitor 914 may monitor activity on a plurality of user devices, including activity with digital content provided by a publisher. Moreover, the activity monitor 914 can monitor budget expenditures, impressions purchases, digital content delivered, or other activities corresponding to a content distribution campaign. The activity monitor 914 can monitor activities to detect satisfaction of a triggering condition.

Moreover, as illustrated in FIG. 9, the digital campaign modification system 104 also includes the content distribution campaign modifier 916. The content distribution campaign modifier 916 can change, update, modify, and/or alter a content distribution campaign. In particular, the content distribution campaign modifier 916 can modify a content distribution campaign according the action(s) in a custom rule. Specifically, in response to detecting satisfaction of a triggering condition (e.g., via the activity monitor 914) the content distribution campaign modifier 916 can apply an action corresponding to the triggering condition to modify a content distribution campaign.

As illustrated in FIG. 9, the digital campaign modification system 104 can include the machine learning manager 922. The machine learning manager 922 can generate, train, apply, and/or teach a machine learning model (e.g., the machine learning model 708 and/or the trained machine learning model 716). For instance, the machine learning manager 922 can train a machine learning model to predict rules (e.g., triggering conditions and/or actions). Moreover, the machine learning manager 922 can apply the trained machine learning model to all or part of a digital content campaign to generated suggested rules.

As shown in FIG. 9, the digital campaign modification system 104 also includes the storage manager 920. The storage manager 920 can maintain data of any type, size, or kind, as necessary to perform the functions of the digital campaign modification system 104. As illustrated, the storage manager 920 can store the trained machine learning model 922 or the custom rules 924 (e.g., custom rules of one or more content distribution campaigns). Although not illustrated, the storage manager 920 can maintain other data, including campaign parameters, historical databases, or other information discussed herein.

As further shown in FIG. 9, the digital campaign modification system 104 includes the social graph 926, which includes node information 928 and edge information 930. The social graph 926 can include node information 928 that stores information comprising nodes for users, nodes for concepts, and/or nodes for content items. In addition, the social graph 926 can include edge information 930 comprising relationships between nodes and/or actions occurring within the social-networking system. Further detail regarding social-networking systems, social graphs, edges, and nodes is presented below in relation to FIG. 13.

The digital campaign modification system 104 can communicate with the social graph 926 to perform its functions. For example, the digital campaign modification system 104 can utilize the social graph 926 to obtain impression opportunities and provide content items. For instance, the digital campaign modification system 104 can obtain user information that includes specific details regarding the potential users to whom a content item is to be potentially distributed. Accordingly, the digital campaign modification system 104 can use the received information to match targeting parameters (e.g., the target audience) in distributing the digital content of the digital content distribution campaign.

Each of the components 904-930 of the digital campaign modification system 104 and their corresponding elements may be in communication with one another using any suitable communication technologies. It will be recognized that although components 902-930 and their corresponding elements are shown to be separate in FIG. 9, any of components 902-930 and their corresponding elements may be combined into fewer components, such as into a single facility or module, divided into more components, or configured into different components as may serve a particular embodiment.

The components 904-930 and their corresponding elements can comprise software, hardware, or both. For example, the components 904-930 and their corresponding elements can comprise one or more instructions stored on a computer-readable storage medium and executable by processors of one or more computing devices. The components 902-930 and their corresponding elements can comprise hardware, such as a special purpose processing device to perform a certain function or group of functions. Additionally, or alternatively, the components 902-930 and their corresponding elements can comprise a combination of computer-executable instructions and hardware.

Furthermore, the components 904-930 of the digital campaign modification system 104 may, for example, be implemented as one or more stand-alone applications, as one or more modules of an application, as one or more plug-ins, as one or more library functions or functions that may be called by other applications, and/or as a cloud-computing model. Thus, the components 904-930 of the digital campaign modification system 104 may be implemented as a stand-alone application, such as a desktop or mobile application. Furthermore, the components 904-930 of the digital campaign modification system 104 may be implemented as one or more web-based applications hosted on a remote server. Alternatively, or additionally, the components of the digital campaign modification system 104 may be implemented in a suit of mobile device applications or "apps."

Figure 10:
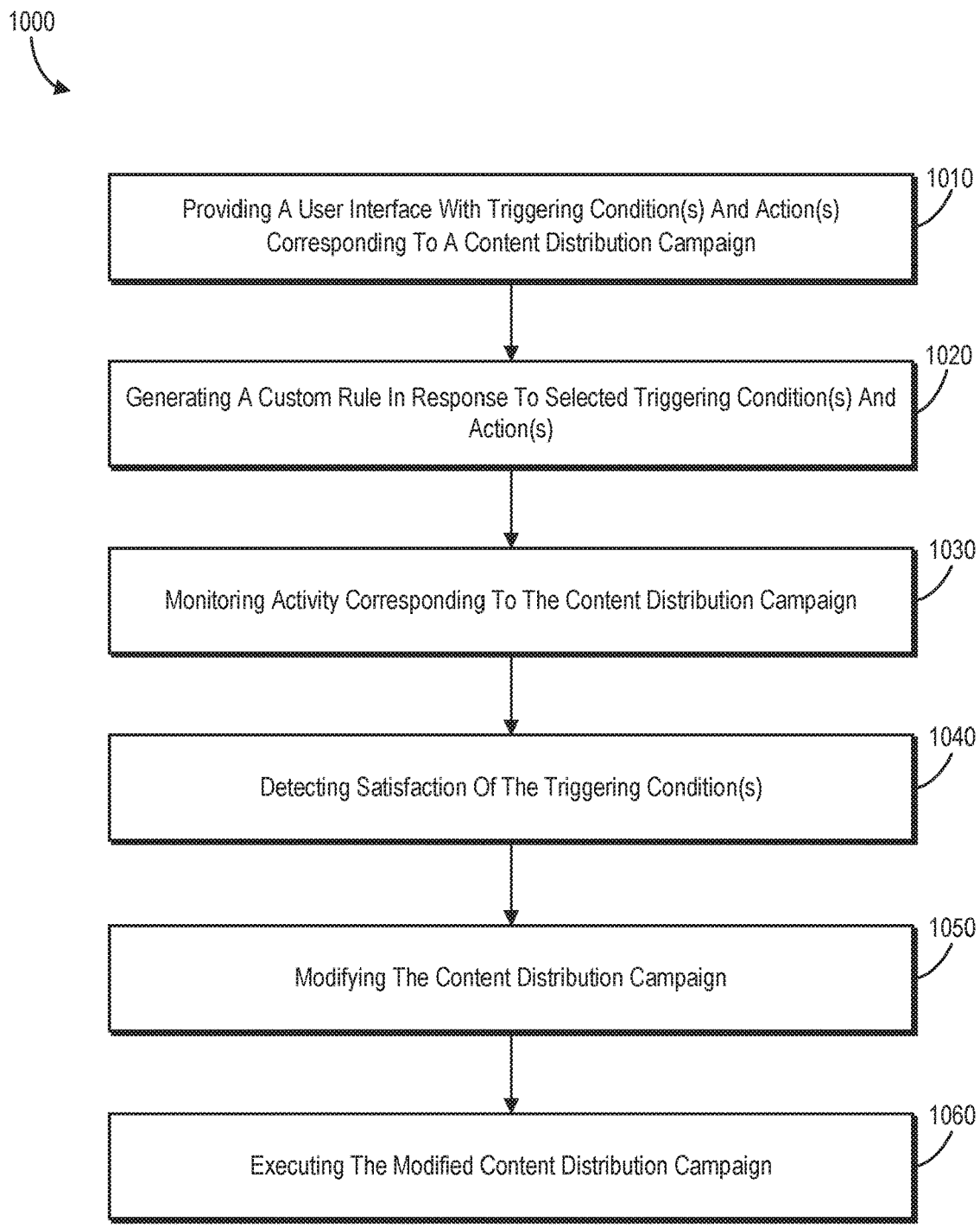
FIG. 10 illustrates a flow chart of a method of dynamically modifying a content distribution campaign in accordance with one or more embodiments.

FIGS. 1-9, the corresponding text, and the examples provide a number of different methods, systems, devices, and non-transitory computer readable media for implementing the digital campaign modification system 104. FIG. 10 illustrates a flowchart of a series of acts 1000 of implementing the digital campaign modification system 104 for a digital content distribution campaign in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In some embodiments, a system can perform the acts of FIG. 10.

The series of acts 1000 includes an act 1010 of providing a user interface with triggering condition(s) and action(s) corresponding to a content distribution campaign. In particular, the act 1010 includes providing for display, to a publisher device, a user interface comprising a plurality of triggering conditions corresponding to a content distribution campaign and a plurality of actions corresponding to the content distribution campaign. For example, in one or more embodiments, the plurality of triggering conditions comprises at least one of a budget threshold, a cost threshold, or an impressions threshold. Additionally, in one or more embodiments, the plurality of actions comprises at least one of a modify budget action, a modify target audience action, a modify bid amount action, or a pause content distribution campaign action. Moreover, the act 1010 includes wherein providing for display, to the publisher device, the user interface comprises providing a notification option via the user interface.

As illustrated, the series of acts 1000 also includes the act 1020 of generating a custom rule in response to the selected triggers and actions. In particular, the act 1020 includes in response to user selection of a triggering condition from the plurality of triggering conditions and user selection of an action from the plurality of actions, generating a custom rule operable to modify the content distribution campaign, the custom rule comprising the triggering condition and the action. For example, in one or more embodiments, the act 1020 includes detecting user selection of a notification option with the triggering condition.

In addition, as illustrated in FIG. 10, the series of acts 1000 includes the act 1030 of monitoring activity corresponding to the content distribution campaign. Specifically, the act 1030 can include, upon executing the content distribution campaign, monitoring activity corresponding to the content distribution campaign to detect satisfaction of the triggering condition. For example, the act 1030 can include monitoring the activity in accordance with a rate of monitoring provided by a user.

As shown in FIG. 10, the series of acts 1000 also includes the act 1040 of detecting satisfaction of the triggering condition(s). In particular, the act 1040 includes detecting, based on the monitored activity, that one or more of the triggering conditions are satisfied. For example, the act 1040 can include monitoring user activity corresponding to a plurality of client devices to detect satisfaction of a triggering condition.

As illustrated in FIG. 10, the series of acts 1000 also includes the act 1050 of modifying the content distribution campaign. Specifically, the act 1050 includes modifying the content distribution campaign according to the actions of the custom rule. For example, the act 1050 includes in response to detecting satisfaction of the triggering condition, automatically modifying the content distribution campaign according to the action of the custom rule. Moreover, the act 1050 can also include in response to detecting satisfaction of the triggering condition automatically providing a notification according to the notification option.

Moreover, as shown in FIG. 10, the series of acts 1000 includes the act 1060 of executing the modified content distribution campaign. In particular, the act 1060 includes in response to detecting satisfaction of the triggering condition, automatically executing the modified content distribution campaign. For example, the act 1060 includes distributing digital content according to the modified content distribution campaign.

In one or more embodiments, providing for display, to the publisher device, the user interface comprises providing a plurality of content distribution campaigns for display via the user interface. Moreover, the series of acts 1000 includes, in response to user selection of at least two content distribution campaigns, generating a custom rule for modifying each of the at least two content distribution campaigns. Furthermore, the series of acts 1000 includes upon executing each of the at least two content distribution campaigns, monitoring activity corresponding to each of the at least two content distribution campaigns from the plurality to detect satisfaction of the triggering condition.

Additionally, in one or more embodiments, the series of acts 1000 includes using a trained machine learning model to provide suggestions to the user. In particular, the series of acts 1000 includes generating a suggested triggering condition and a corresponding suggested action by analyzing the content distribution campaign utilizing a machine learning model trained based on a plurality of historical content distribution campaigns. For example, the series of acts 1000 includes providing the suggested triggering condition and the corresponding suggested action for display to the publisher device via the user interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
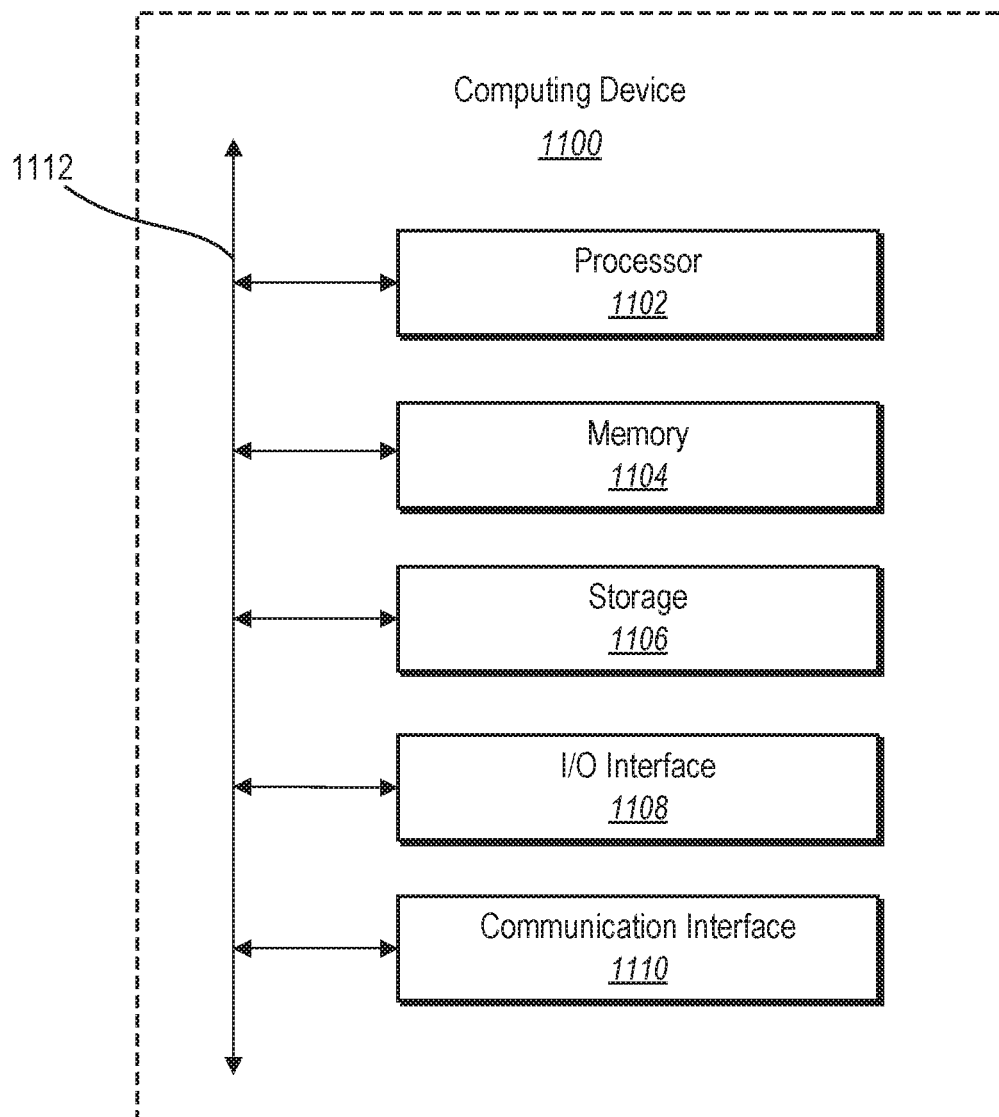
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement one or more components the digital video insertion system 112. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage device 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, in one or more embodiments, the digital campaign modification system 104 operates in connection with a social networking system (e.g., the networking system 110 as described with reference to FIG. 1). In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 12:
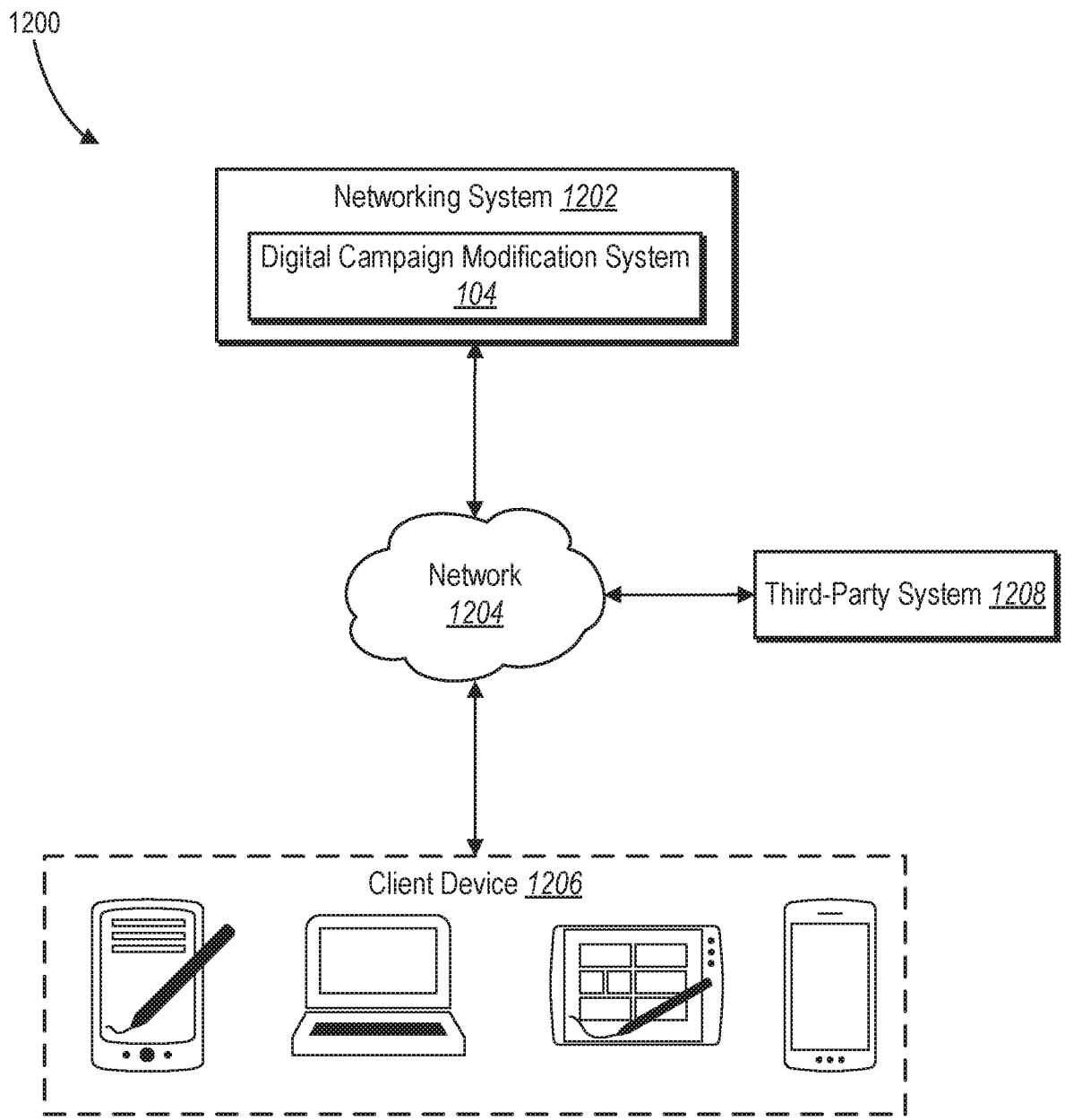
FIG. 12 illustrates a network environment of a networking system in accordance with one or more embodiments.

FIG. 12 illustrates an example network environment 1200 of a social networking system. Network environment 1200 includes a client device 1206, a networking system 1202 (e.g., a social networking system and/or an electronic messaging system), and a third-party system 1208 connected to each other by a network 1204. Although FIG. 12 illustrates a particular arrangement of client device 1206, networking system 1202, third-party system 1208, and network 1204, this disclosure contemplates any suitable arrangement of client device 1206, networking system 1202, third-party system 1208, and network 1204. As an example and not by way of limitation, two or more of client device 1206, networking system 1202, and third-party system 1208 may be connected to each other directly, bypassing network 1204. As another example, two or more of client device 1206, networking system 1202, and third-party system 1208 may be physically or logically co-located with each other in whole or in part. Moreover, although FIG. 12 illustrates a particular number of client devices 1206, networking systems 1202, third-party systems 1208, and networks 1204, this disclosure contemplates any suitable number of client devices 1206, networking systems 1202, third-party systems 1208, and networks 1204. As an example and not by way of limitation, network environment 1200 may include multiple client device 1206, networking systems 1202, third-party systems 1208, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client device 1206, networking system 1202, and third-party system 1208 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment

1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example and not by way of limitation, a client device 1206 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1206. A client device 1206 may enable a network user at client device 1206 to access network 1204. A client device 1206 may enable its user to communicate with other users at other client devices 1206.

In particular embodiments, client device 1206 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1206 may enter a Uniform Resource Locator (URL) or other address directing the web browser to a particular server (such as server, or a server associated with a third-party system 1208), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. Client device 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1202 may be a network-addressable computing system that can host an online social network. Networking system 1202 may generate, store, receive, and send social-networking data, such as, for example, user-profile data, concept-profile data, social-graph information, or other suitable data related to the online social network. Networking system 1202 may be accessed by the other components of network environment 1200 either directly or via network 1204. In particular embodiments, networking system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, a networking system 1202, or a third-party system 1208 to manage, retrieve, modify, add, or delete, the information stored in data store.

In particular embodiments, networking system 1202 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1202 may provide users of the online social network the ability to communicate and interact with other users. In particular embodiments, users may join the online social network via networking system 1202 and then add connections (e.g., relationships) to a number of other users of networking system 1202 that they want to be connected to. Herein, the term "friend" may refer to any other user of networking system 1202 with whom a user has formed a connection, association, or relationship via networking system 1202.

In particular embodiments, networking system 1202 may provide users with the ability to take actions on various types of items or objects, supported by networking system 1202. As an example and not by way of limitation, the items and objects may include groups or social networks to which users of networking system 1202 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1202 or by an external system of third-party system 1208, which is separate from networking system 1202 and coupled to networking system 1202 via a network 1204.

In particular embodiments, networking system 1202 may be capable of linking a variety of entities. As an example and not by way of limitation, networking system 1202 may enable users to interact with each other as well as receive content from third-party systems 1208 or other entities, or to allow users to interact with these entities through an application programming interfaces (API) or other communication channels.

In particular embodiments, a third-party system 1208 may include one or more types of servers, one or more data stores, one or more interfaces, including but not limited to APIs, one or more web services, one or more content sources, one or more networks, or any other suitable components, e.g., that servers may communicate with. A third-party system 1208 may be operated by a different entity from an entity operating networking system 1202. In particular embodiments, however, networking system 1202 and third-party systems 1208 may operate in conjunction with each other to provide social-networking services to users of networking system 1202 or third-party systems 1208. In this sense, networking system 1202 may provide a platform, or backbone, which other systems, such as third-party systems 1208, may use to provide social-networking services and functionality to users across the Internet.

In particular embodiments, a third-party system 1208 may include a third-party content object provider. A third-party content object provider may include one or more sources of content objects, which may be communicated to a client device 1206. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1202 also includes user-generated content objects, which may enhance a user's interactions with networking system 1202. User-generated content may include anything a user can add, upload, send, or "post" to networking system 1202. As an example and not by way of limitation, a user communicates posts to networking system 1202 from a client device 1206. Posts may include data such as status updates or other textual data, location information, photos, videos, links, music or other similar data or media. Content may also be added to networking system 1202 by a third-party through a "communication channel," such as a newsfeed or stream.

In particular embodiments, networking system 1202 may include a variety of servers, sub-systems, programs, modules, logs, and data stores. In particular embodiments, networking system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1202 may also include suitable components such as network interfaces, security mechanisms, load balancers, failover servers, management-and-network-operations consoles, other suitable components, or any suitable combination thereof. In particular embodiments, networking system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1202 to one or more client devices 1206 or one or more third-party system 1208 via network 1204. The web server may include a mail server or other messaging functionality for receiving and routing messages between networking system 1202 and one or more client devices 1206. An API-request server may allow a third-party system 1208 to access information from networking system 1202 by calling one or more APIs. An action logger may be used to receive communications from a web server about a user's actions on or off networking system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of networking system 1202. A privacy setting of a user determines how particular information associated with a user can be shared. The authorization server may allow users to opt in to or opt out of having their actions logged by networking system 1202 or shared with other systems (e.g., third-party system 1208), such as, for example, by setting appropriate privacy settings. Third-party-content-object stores may be used to store content objects received from third parties, such as a third-party system 1208. Location stores may be used for storing location information received from client devices 1206 associated with users. Advertisement-pricing modules may combine social information, the current time, location information, or other suitable information to provide relevant advertisements, in the form of notifications, to a user.

Figure 13:
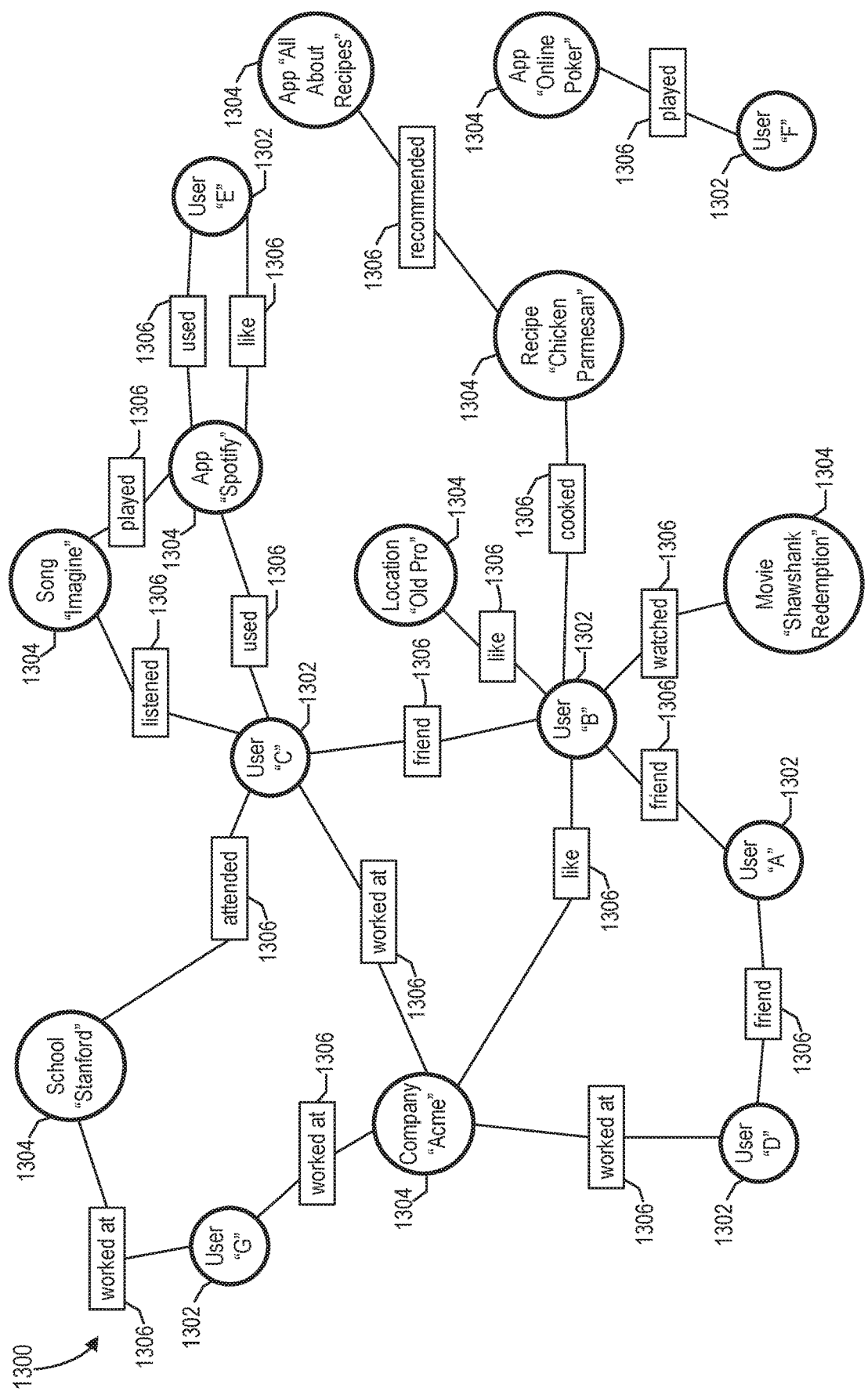
FIG. 13 illustrates a social graph in accordance with one or more embodiments.

FIG. 13 illustrates example social graph 1300. In particular embodiments, networking system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a networking system 1202, client device 1206, or third-party system 1208 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of networking system 1202. As an example and not by way of limitation, a user may be an individual (human user), an entity (e.g., an enterprise, business, or third-party application), or a group (e.g., of individuals or entities) that interacts or communicates with or over networking system 1202. In particular embodiments, when a user registers for an account with networking system 1202, networking system 1202 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with networking system 1202. In particular embodiments, a user node 1302 may be associated with information provided by a user or information gathered by various systems, including networking system 1202. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with networking system 1202 or a third-party website associated with a web-application server); an entity (such as, for example, a person, business, group, sports team, or celebrity); a resource (such as, for example, an audio file, video file, digital photo, text file, structured document, or application) which may be located within networking system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including networking system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to networking system 1202. Profile pages may also be hosted on third-party websites associated with a third-party system 1208. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1208. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1206 to send to networking system 1202 a message indicating the user's action. In response to the message, networking system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, networking system 1202 may send a "friend request" to the second user. If the second user confirms the "friend request," networking system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to an edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, networking system 1202 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, networking system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, networking system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client device 1206) may indicate that he or she likes the concept represented by the concept node 1304 by clicking or selecting a "Like" icon, which may cause the user's client device 1206 to send to networking system 1202 a message indicating the user's liking of the concept associated with the concept-profile page. In response to the message, networking system 1202 may create an edge 1306 between user node 1302 associated with the user and concept node 1304, as illustrated by "like" edge 1306 between the user and concept node 1304. In particular embodiments, networking system 1202 may store an edge 1306 in one or more data stores. In particular embodiments, an edge 1306 may be automatically formed by networking system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1202). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1202 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1202) or RSVP (e.g., through networking system 1202) to an event associated with the advertisement. In addition or as an alternative, an advertisement may include social-networking-system context directed to the user. As an example and not by way of limitation, an advertisement may display information about a friend of the user within networking system 1202 who has taken an action associated with the subject matter of the advertisement.

In particular embodiments, networking system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1208 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1202 may calculate a coefficient based on a user's actions. Networking system 1202 may monitor such actions on the online social network, on a third-party system 1208, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1202 may calculate a coefficient based on the user's actions with particular types of content. The content may be associated with the online social network, a third-party system 1208, or another suitable system. The content may include users, profile pages, posts, news stories, headlines, instant messages, chat room conversations, emails, advertisements, pictures, video, music, other suitable objects, or any combination thereof. Networking system 1202 may analyze a user's actions to determine whether one or more of the actions indicate an affinity for subject matter, content, other users, and so forth. As an example and not by way of limitation, if a user may make frequently posts content related to "coffee" or variants thereof, networking system 1202 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1202 may calculate a coefficient based on the type of relationship between particular objects. Referencing the social graph 1300, networking system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user node 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1202 may determine that the user has a higher coefficient with respect to the first photo than the second photo because having a tagged-in-type relationship with content may be assigned a higher weight and/or rating than having a like-type relationship with content. In particular embodiments, networking system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1202 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, networking system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1206 of the user). A first user may be more interested in other users or concepts that are closer to the first user. As an example and not by way of limitation, if a user is one mile from an airport and two miles from a gas station, networking system 1202 may determine that the user has a higher coefficient for the airport than the gas station based on the proximity of the airport to the user.

In particular embodiments, networking system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1202 may provide information that is relevant to user's interests and current circumstances, increasing the likelihood that they will find such information of interest. In particular embodiments, networking system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1208 (e.g., via an API or other communication channel), or from another suitable system. In response to the request, networking system 1202 may calculate the coefficient (or access the coefficient information if it has previously been calculated and stored). In particular embodiments, networking system 1202 may measure an affinity with respect to a particular process. Different processes (both internal and external to the online social network) may request a coefficient for a particular object or set of objects. Networking system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by networking system 1202 or shared with other systems (e.g., third-party system 1208). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1208, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1202 may send a request to the data store for the object. The request may identify the user associated with the request and may only be sent to the user (or a client device 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
providing for display, to a publisher device, a user interface to generate custom rules comprising triggering conditions and actions for content distribution campaigns;
providing, for display within the user interface, a plurality of triggering conditions corresponding to the content distribution campaign, the plurality of triggering conditions comprising one or more triggering conditions selectable from a first set of triggering conditions and one or more additional triggering conditions selectable from a second set of recommended triggering conditions;
providing, for display within the user interface, a plurality of actions corresponding to the content distribution campaign, the plurality of actions comprising one or more actions selectable from a first set of actions and one or more additional actions selectable from a second set of recommended actions;
in response to user selection of a triggering condition from the plurality of triggering conditions and user selection of an action from the plurality of actions, generating a custom rule operable to modify the content distribution campaign, the custom rule comprising the triggering condition and the action;
upon executing the content distribution campaign, monitoring activity corresponding to the content distribution campaign to detect satisfaction of the triggering condition; and
in response to detecting satisfaction of the triggering condition, automatically:
modifying the content distribution campaign according to the action of the custom rule; and
executing the modified content distribution campaign.

2. The method of claim 1, wherein the plurality of triggering conditions comprises at least one of a budget threshold, a cost threshold, or an impressions threshold.

3. The method of claim 1, wherein the plurality of actions comprises at least one of a modify budget action, a modify target audience action, a modify bid amount action, or a pause content distribution campaign action.

4. The method of claim 1, wherein providing for display, to the publisher device, the user interface comprises providing a notification option via the user interface, and the method further comprising:
detecting user selection of the notification option and the triggering condition; and
in response to detecting satisfaction of the triggering condition automatically providing a notification according to the notification option.

5. The method of claim 1, wherein providing for display, to the publisher device, the user interface comprises providing a plurality of content distribution campaigns for display via the user interface.

6. The method of claim 5, further comprising:
in response to user selection of at least two content distribution campaigns, generating a custom rule for modifying each of the at least two content distribution campaigns; and
upon executing each of the at least two content distribution campaigns, monitoring activity corresponding to each of the at least two content distribution campaigns from the plurality to detect satisfaction of the triggering condition.

7. The method of claim 1, further comprising generating the second set of recommended triggering conditions and the second set of recommended actions by analyzing the content distribution campaign utilizing a machine learning model trained based on a plurality of historical content distribution campaigns.

8. A system comprising:
   at least one processor; and
   at least one non-transitory computer readable storage medium storing instructions that, when executed by the at least one processor, cause the system to:
   provide for display, to a publisher device, a user interface to generate custom rules comprising triggering conditions and actions for content distribution campaigns;
   providing, for display within the user interface, a plurality of triggering conditions corresponding to the content distribution campaign, the plurality of triggering conditions comprising one or more triggering conditions selectable from a first set of triggering conditions and one or more additional triggering conditions selectable from a second set of recommended triggering conditions;
   providing, for display within the user interface, a plurality of actions corresponding to the content distribution campaign, the plurality of actions comprising one or more actions selectable from a first set of actions and one or more additional actions selectable from a second set of recommended actions;
   in response to user selection of a triggering condition from the plurality of triggering conditions and user selection of an action from the plurality of actions, generate a custom rule comprising the triggering condition and the action;
   upon executing the content distribution campaign, monitor activity corresponding to the content distribution campaign to detect satisfaction of the triggering condition; and
   in response to detecting satisfaction of the triggering condition, automatically:
   modify the content distribution campaign according to the action of the custom rule; and
   execute the modified content distribution campaign.

9. The system of claim 8, wherein:
   the plurality of triggering conditions comprises at least one of a budget threshold, a cost threshold, or an impressions threshold.

10. The system of claim 8, wherein:
    the plurality of actions comprises at least one of a modify budget action, a modify target audience action, a modify bid amount action, or a pause content distribution campaign action.

11. The system of claim 8, further comprising storing instructions that, when executed by the at least one processor, cause the system to:
    provide a notification option via the user interface; and
    in response to detecting satisfaction of the triggering condition, automatically generate a notification according to the notification option.

12. The system of claim 8, further comprising instructions that, when executed by the at least one processor, cause the system to:
    provide for display, to the publisher device, the user interface by providing a plurality of content distribution campaigns for display via the user interface;
    in response to user selection of at least two content distribution campaigns, generate a custom rule for modifying each of the at least two content distribution campaigns; and
    upon executing each of the at least two content distribution campaigns, monitor activity corresponding to each of the at least two content distribution campaigns from the plurality to detect satisfaction of the triggering condition.

13. The system of claim 8, further comprising instructions that, when executed by the at least one processor, cause the system to
    generate the second set of recommended triggering conditions and the second set of recommended actions by analyzing the content distribution campaign utilizing a machine learning model trained by a plurality of historical content distribution campaigns.

14. A non-transitory computer readable medium storing instructions thereon that, when executed by at least one processor, cause a computer system to:
    provide for display, to a publisher device, a user interface to generate custom rules comprising triggering conditions and actions for content distribution campaigns;
    provide, for display within the user interface, a plurality of triggering conditions corresponding to the content distribution campaign, the plurality of triggering conditions comprising one or more triggering conditions selectable from a first set of triggering conditions and one or more additional triggering conditions selectable from a second set of recommended triggering conditions;
    provide, for display within the user interface, a plurality of actions corresponding to the content distribution campaign, the plurality of actions comprising one or more actions selectable from a first set of actions and one or more additional actions selectable from a second set of recommended actions;
    in response to user selection of a triggering condition from the plurality of triggering conditions and user selection of an action from the plurality of actions, generate a custom rule comprising the triggering condition and the action;
    upon executing the content distribution campaign, monitor activity corresponding to the content distribution campaign to detect satisfaction of the triggering condition; and
    in response to detecting satisfaction of the triggering condition, automatically:
    modify the content distribution campaign according to the action of the custom rule; and
    execute the modified content distribution campaign.

15. The non-transitory computer readable medium of claim 14, wherein the plurality of triggering conditions comprises at least one of a budget threshold, a cost threshold, or an impressions threshold.

16. The non-transitory computer readable medium of claim 14, wherein the plurality of actions comprises at least one of a modify budget action, a modify target audience action, a modify bid amount action, or a pause content distribution campaign action.

17. The non-transitory computer readable medium of claim 14, further comprising instructions that, when executed by the at least one processor, cause the computer system to:
    provide for display, to the publisher device, the user interface by providing a notification option via the user interface; and in response to detecting satisfaction of the triggering condition, automatically generate a notification according to the notification option.

18. The non-transitory computer readable medium of claim 14, further comprising instructions that, when executed by the at least one processor, cause the computer system to:
provide for display, to the publisher device, the user interface by providing a plurality of content distribution campaigns for display via the user interface;
in response to user selection of at least two content distribution campaigns, generate a custom rule for modifying each of the at least two content distribution campaigns; and
upon executing each of the at least two content distribution campaigns, monitor activity corresponding to each of the at least two content distribution campaigns from the plurality to detect satisfaction of the triggering condition.

19. The non-transitory computer readable medium of claim 14, further comprising instructions that, when executed by the at least one processor, cause the computer system to
generate the second set of recommended triggering conditions and the second set of recommended actions by analyzing the content distribution campaign utilizing a machine learning model trained based on a plurality of historical content distribution campaigns.

20. The non-transitory computer readable medium of claim 14, further comprising instructions that, when executed by the at least one processor, cause the computer system to update at least one of the second set of recommended triggering conditions or the second set of recommended actions in response to receipt of additional data for the content distribution campaign.

* * * * *